United States Patent [19]
Asakura et al.

[11] Patent Number: 5,713,056
[45] Date of Patent: Jan. 27, 1998

[54] FILM FEEDING APPARATUS OF CAMERA

[75] Inventors: Yasuo Asakura, Hachioji; Shinya Takahashi, Kodaira; Akira Inoue, Nagano-ken; Tatsuo Takanashi, Hachioji, all of Japan

[73] Assignee: Olympus Optical Co., Ltd., Tokyo, Japan

[21] Appl. No.: 654,041

[22] Filed: May 28, 1996

[30] Foreign Application Priority Data

Jun. 1, 1995 [JP] Japan ................................. 7-134878
Jul. 13, 1995 [JP] Japan ................................. 7-177039

[51] Int. Cl.⁶ ................................................. G03B 19/02
[52] U.S. Cl. ................................................. 396/396
[58] Field of Search ............................ 354/173.1, 173.11, 354/212, 214, 215, 217, 484, 105, 106; 396/387, 389, 390, 395, 396, 413, 406

[56] References Cited

U.S. PATENT DOCUMENTS 4,965,600  10/1990  Smart et al. ........................... 354/212

*Primary Examiner*—Safet Metjahic
*Assistant Examiner*—Nicholas J. Tuccillo
*Attorney, Agent, or Firm*—Kenyon & Kenyon

[57] ABSTRACT

A film feeding apparatus of a camera moves a film when the camera is switched to its nonoperative state or has not been operated for a predetermined time, in order that focusing is not affected by film deformation caused by a pair of flanges of the film cartridge when the film has been left for a long time. A film feeding motor feeds the film, and a perforation detector or a film encoder outputs a signal corresponding to the feeding amount of the film. When the camera is switched to its nonoperative state or has not been operated for the predetermined time, a CPU in response to the film feeding amount signal causes the film to be moved by a predetermined amount in a first direction. Further, when the camera is switched to its operative state or an operation command is inputted, the CPU causes the film to be moved in a second direction opposite to the first direction. Thus, when the film has not been exposed for a long time, a frame of the film to be next exposed is moved to a position which is not susceptible to film deformation.

31 Claims, 19 Drawing Sheets

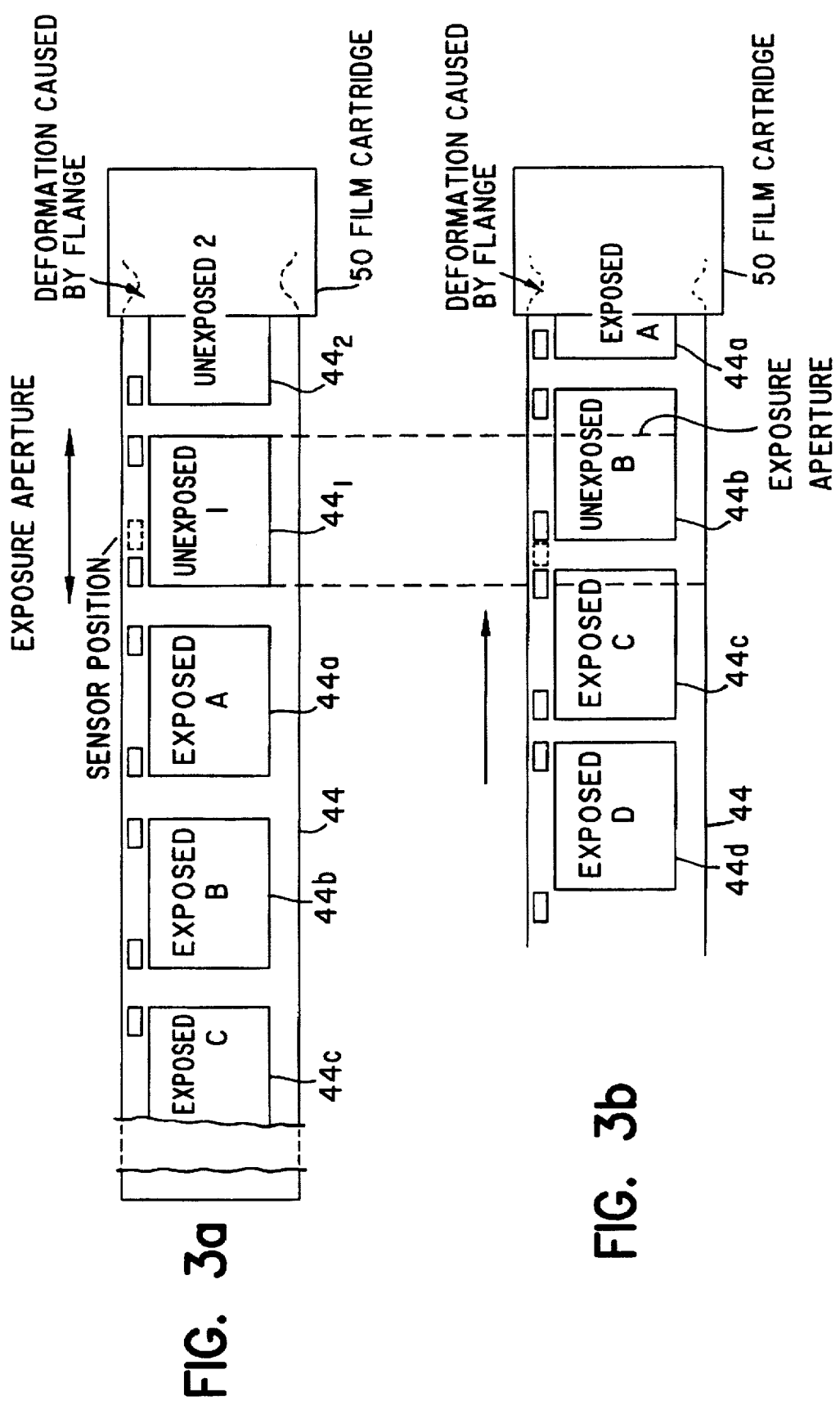

FIG. 5
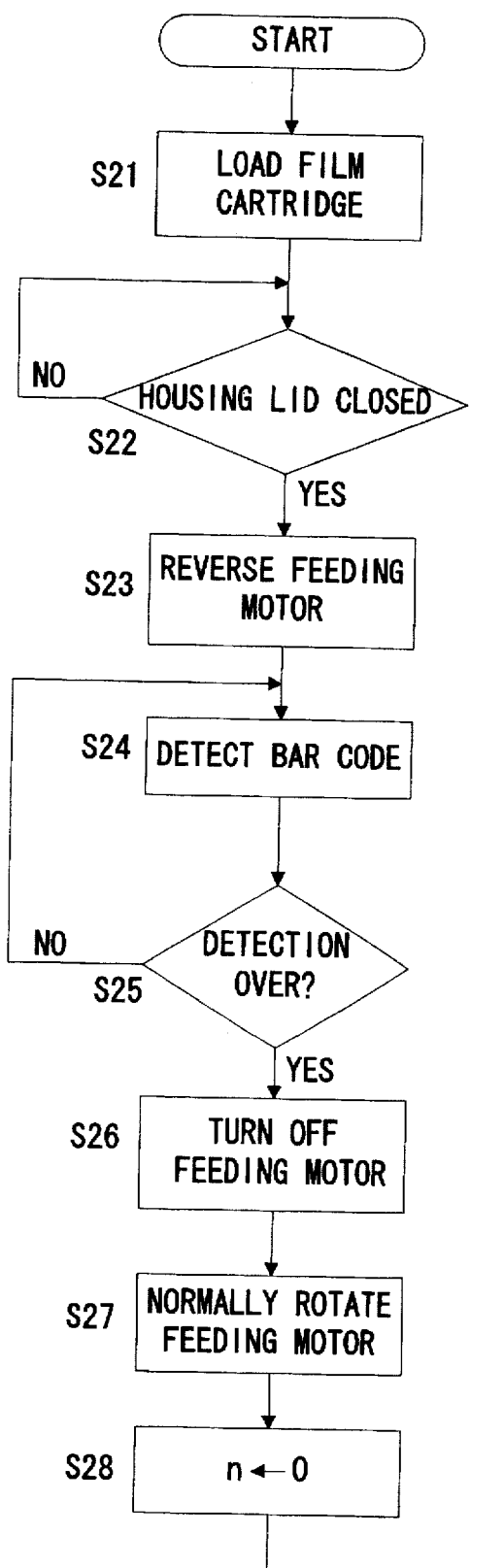
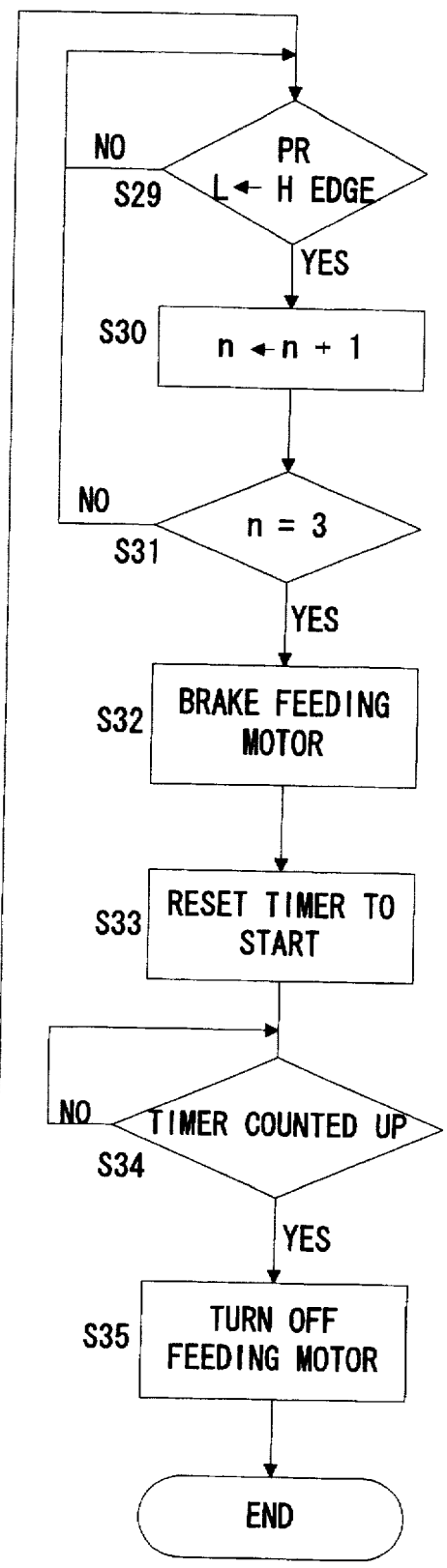

FILM FEEDING APPARATUS OF CAMERA

BACKGROUND OF THE INVENTION

1. Field of the Invention

This invention relates to a film feeding apparatus of a camera using a film cartridge which includes a spool for winding a photographic film thereon, each end of the spool being provided with a flange which is provided with an annular lip or skirt, both lips or skirts partially covering from both sides the film wound on the spool to prevent loosening of the winding of the film and feed the film into the camera by rotating the spool in the feeding direction.

2. Description of the Related Art

Recently, there have been developed cameras and film cartridges which use a film having a magnetic recording portion to write various kinds of information about photographing.

For example, U.S. Pat. No. 5,251,840 and Japanese Laid-Open Patent Application Publication No. 5-45801 discloses such a film cartridge. The cartridge includes a spool for winding a photographic film thereon and a flange formed of a flexible material is fitted to each end of the spool. An annular lip or skirt is integrally molded on the peripheral edge of each flange. Both lips or skirts partially cover from both sides the outermost periphery of the film wound on the spool to prevent loosening of the winding of the film. Thus, when the spool in the cartridge (hereinafter called "cartridge spool") is rotated in the feeding direction, the photographic film will not loosen and will rotate together with the cartridge spool.

Further, in the vicinity of the film passageway provided to the body of the film cartridge, the above described annular lips or skirts are flexed away from each other, and the photographic film can be lead through the film passageway and fed out.

FIG. 18 shows the state of film when the above film cartridge is loaded into a camera.

In this figure, a film 1 is in a cartridge case 2 housed in such a manner that it is wound around a cartridge spool 3 which is inside the cartridge case 2. Flanges 4 and 5 formed of a flexible material are fitted loosely to respective end portions of the cartridge spool 3. Annular lips or skirts 4a and 5a are integrally formed on the outer peripheral edges of the flanges 4 and 5, and to prevent the film 1 from loosening.

The film 1 fed into the camera from the inside of the cartridge passes behind an exposure aperture 6 of the camera and is wound around a spool 7 inside the camera. At this time, the flanges 4 and 5 in the vicinity of a film passageway 8 are elastically deformed and flexed away from each other in the width direction of the film 1. The film 1 has perforations 1a positioned at predetermined intervals on its one side.

As shown in FIG. 18, when the above cartridge is loaded into the camera, pressures F and F' are caused by elastic deformation of the flanges 4b and 5b and applied to the film 1 in the vicinity of the film passageway 8. Thus, if the camera is left for an unduly long time in such a state as shown in FIG. 18, pressures F and F' will cause deformation to the film 1 which will cause difficulty for it to return to its former state in a short time.

FIGS. 19(a) and 19(b) each show a cross section of the film 1 in its width direction. FIG. 19(a) shows an ordinary state of the film 1 being curled, and FIG. 19(b) shows a state of the film 1 being curled after pressures F and F' have been applied to it for a long time.

Generally, a photographic film has a characteristic of curling to the side of an emulsion layer 1b. As shown in FIG. 19(a), the curling amount C1 in the ordinary state falls within a predetermined range.

However, as shown in FIG. 19(b), a part of the film 1 which receives pressures F and F' for a long time undergoes a curling deformation whose curling amount $C_2$ exceeds the predetermined range.

FIGS. 20(a) and 20(b) each are a cross-sectional view taken along line A-A' of FIG. 18. FIG. 20(a) is a cross-sectional view showing an ordinary state of the film. FIG. 20(b) is a cross-sectional view showing a state of the film when one frame is wound up after the camera containing the film has been left unused for a long time so that the next frame 1c having received pressures F and F' is positioned on the exposure aperture 6 of the camera. The section at A-A' is a section of the exposure aperture 6 at the position to which that portion of the film 1 which has received pressures F and F' during a long time non-use of the camera, is moved after the film is wound up.

In FIG. 20(a), the upper portion and the lower portion of the exposure aperture 6 provided to the camera body 9 are provided with a pair of conventional film rail surfaces 9a and a pair of conventional pressure plate surfaces 9b. Also, a pressure plate 10 is pressed to the pressure plate rail surfaces 9b.

The film 1 in its ordinary state substantially touches the pressure plate 10 and maintains its plane state inside the exposure aperture 6. Even when the film 1 comes apart from the pressure plate 10 because of variation of the width of the film 1 or environmental change, the amount $Z_1$ of loosening is approximately within 0–0.02 mm.

However, as shown in FIG. 20(b), in that portion of the film 1 to which pressures F and F' have been applied for a long time, the curling in the central part is turned over by being pressed by the pressure plate 10, and the film 1 will largely protrude from the pressure plate 10 towards the front of the camera.

As a concrete example, immediately after one frame is wound up after pressures F and F' of about 30 g have been applied to the film for 24 hours, the amount $Z_2$ of loosening in the central part will be about 0.03–0.10 mm. When a photograph is taken in this state, the photograph will be out of focus since the light sensitive surface of the film is largely deviated from the image plane of the lens in the central part of the picture.

SUMMARY OF THE INVENTION

This invention has been made in order to solve the above mentioned problems, and an object of this invention is to provide a film feeding apparatus of a camera which can take a photograph in focus even after a photographic film has been left in the camera for an unduly long time.

According to an aspect of this invention, a film feeding apparatus of a camera into which a film cartridge containing a film and having a film feeding function can be loaded, comprises film feeding means for controlling the feeding of the film in a first direction, feeding amount detecting means for outputting a signal corresponding to a feeding amount of the film fed by the film feeding means, first control means for controlling the film feeding means to feed the film in a first direction by a predetermined amount in response to the output signal of the film feeding amount detecting means when the camera is switched to a nonoperative state or when the camera has not been operated for a predetermined time, and second control means responsive to the camera being switched to an operative state or to an input of an operation command, for controlling the film feeding means to feed the film in a second direction opposite to the first direction of the film feeding controlled by the first control means, whereby a deformed portion of the film caused by the film cartridge does not affect the flatness of the film at the time of photographing.

According to another aspect of this invention, a film feeding apparatus of a camera capable of using a film cartridge containing a film and having a film feeding function comprises determining means for determining that the film of the film cartridge has not been exposed for a predetermined time, and control means for moving a frame of the film to be next exposed to a position where the frame of the film is not susceptible to deformation by the film cartridge.

According to still another aspect of this invention, a film feeding apparatus of a camera capable of using a film cartridge containing a film and having a film feeding function comprises film feeding means for feeding the film of the film cartridge, first film feeding control means for controlling the film feeding means to feed a predetermined amount of the film into the film cartridge, holding means for holding for a predetermined time the film wound inside the film cartridge by the film feeding means, second film feeding control means for controlling the film feeding means to feed the predetermined amount of the film outside the film cartridge after the predetermined time has passed, whereby a deformed portion of the film caused by the film cartridge is corrected.

According to a further aspect of this invention, a film feeding apparatus of a camera capable of using a film cartridge containing a film and having a film feeding function is characterized in that a deformed portion of the film caused by the film cartridge is moved into the film cartridge and corrected and that the corrected portion of the film is fed out of the film cartridge.

BRIEF DESCRIPTION OF THE DRAWINGS

FIGS. 3(a) and 3(b) are schematic views showing the concept of a first embodiment of this invention.

FIG. 5 is a flowchart of an initial winding-up operation of a film in the camera shown in FIG. 1.

DETAILED DESCRIPTION OF THE PREFERRED EMBODIMENTS

Figure 1:
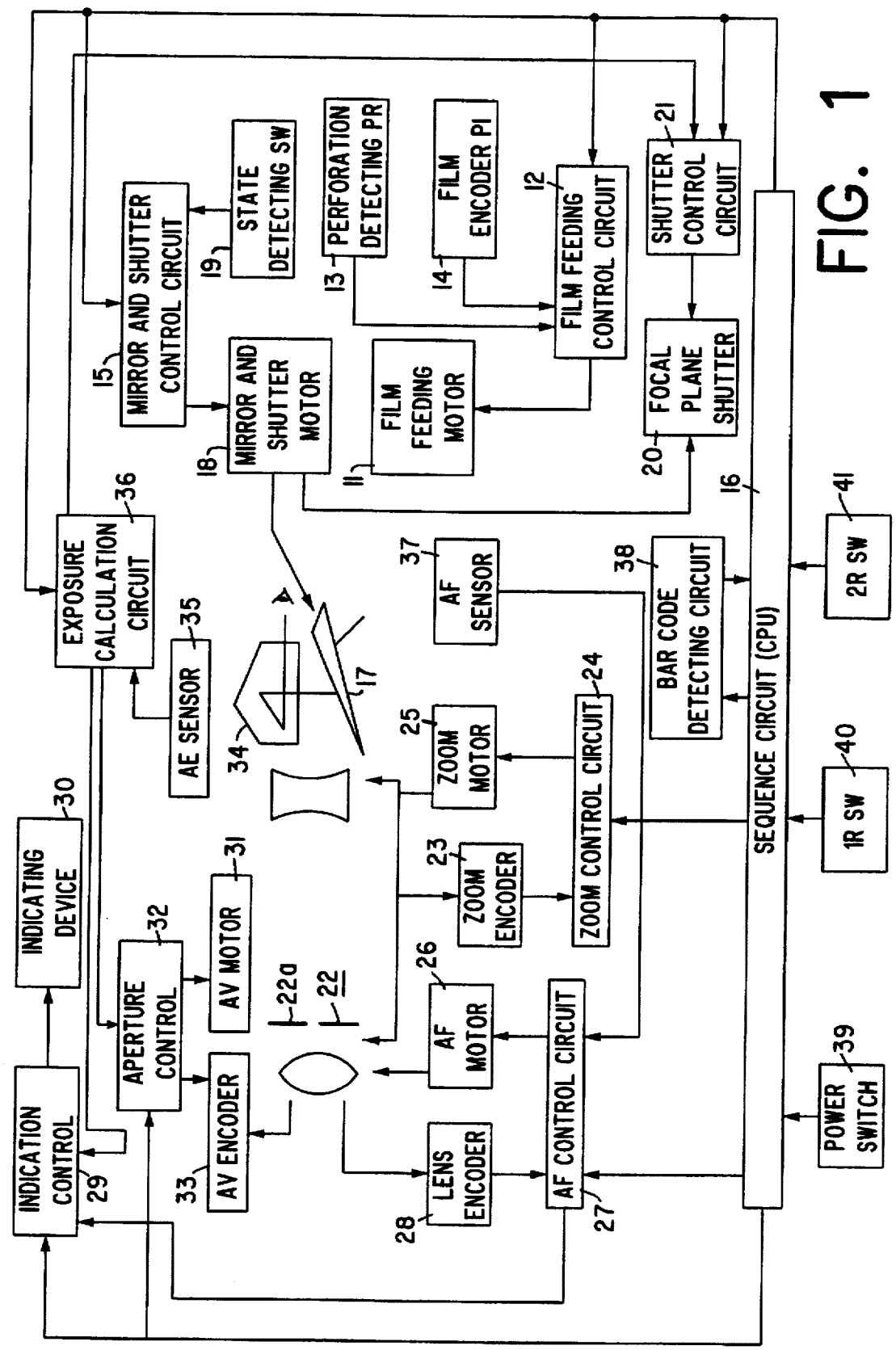
FIG. 1 is a block diagram of a structure of a camera to which this invention is applied.

Referring to the drawings, embodiments of this invention will now be described.

FIG. 1 is a block diagram of a structure of a camera to which this invention is applied.

In FIG. 1, a film feeding motor 11 is coupled to a rewind fork for rotating a film cartridge shaft, and a film winding spool, and the operation of the film feeding motor 11 is controlled by a film feeding control circuit 12 which controls film feeding, such as initial winding-up, one frame winding, and rewinding. The film feeding control circuit 12 is coupled to a perforation detecting photoreflector (PR) 13 for detecting perforations provided to the film 1, two perforations being provided per frame, and a film encoder (photo interrupter PI) 14 which generates an output in conjunction with a press roller touching the film. The photointerrupter 14 generates dozens of pulses while one film frame is wound. The film feeding control circuit 12 as well as a mirror and shutter control circuit 15 is controlled by a sequence circuit (CPU) 16. The sequence circuit 16 controls the operation of various control circuits and the like which will be described later.

A movable mirror 17 is provided to change over the object light beam coming through a taking lens 22 either to a pentagonal prism 34 forming a part of a finder optical system or to a focal plane shutter 20. The mirror and shutter control circuit 15 is to control the mirror 17 and the shutter 20 and coupled to the sequence circuit 16 so as to receive a control signal therefrom, to a state detecting switch 19 so as to receive a mirror-up position signal, a mirror-down position signal and a shutter charge completing position signal outputted therefrom, and to a mirror and shutter motor 18 so as to output a control signal to the mirror and shutter motor 18 for moving the mirror 17 up and down and charging the shutter 20. The shutter 20 is controlled by the sequence circuit 16 through a shutter control circuit 21.

The focal length of the taking lens 22 positioned in front of the mirror 17 is changed by a zoom control circuit 24 through a zoom motor 25. The zoom control circuit 24 is to control the telephoto, wideangle, and sinking positions of the taking lens 22, and a signal from a zoom encoder 23 for detecting the focal length is input thereto.

The output of an AF (autofocus) control circuit 27 for detecting the focusing state of the taking lens 22 based on the output of an AF sensor 37 to control the focusing operation is transmitted to an AF motor 26, thereby to focus the taking lens 22. A lens encoder 28 detects the present position of the focusing lens of the taking lens 22, and the AF control circuit 27 uses the output signal from the lens encoder 28 for focusing. The output of the AF control circuit 27 is also output to an indication control circuit 29 for preparing information which is necessary for photographing and to be indicated. This indication control circuit 29 controls an indicating device 30 formed by a liquid crystal display or the like, so as to indicate the focusing state (such as in focus and out of focus), exposure control information (such as aperture stop and shutter speed), camera modes or the like.

An AV (aperture value) motor 31 is provided so as to drive an aperture stop 22a, and is controlled by an aperture control circuit 32 which controls to a predetermined aperture value. The aperture control circuit 32 controls the aperture stop 22a on the basis of a control signal indicative of the aperture value calculated by an exposure calculation circuit 36, and an output signal of an AV encoder 33 which detects a present aperture value of the aperture stop 22a.

Further, an AE (automatic exposure) sensor 35 for detecting the object brightness is provided in the vicinity of the pentagonal prism 34. The output of the AE sensor 35 is output to the exposure calculation circuit 36, where the shutter speed and the aperture value is calculated.

The AF sensor 37 is provided in the lower part of the mirror box (not shown) where the mirror 17 is positioned, and an image of an object passing through the taking lens 22 is formed on the AF sensor 37, and the sensor output is output to the AF control circuit 27.

The sequence circuit 16 is also coupled to a bar code detecting circuit 38 for reading bar-coded film information provided on a film cartridge, a power switch 39 for determining the permission and prohibition of the photographing operation, a first release switch 40 which is opened or closed by pushing a release button halfway, and a second release switch 41 which is opened or closed by pushing the release button completely. The first release switch 40 is operated to perform the AF and AE calculation and lens extension for preparing the photographing, and the second release switch 41 is operated to take a photograph. The functions of the sequence circuit 16 are implemented by a central processing unit (CPU), and the film feeding control circuit 12, the shutter control circuit 21, the AF control circuit 27, the exposure calculation circuit 36 and the like may be replaced by the CPU.

Figure 2:
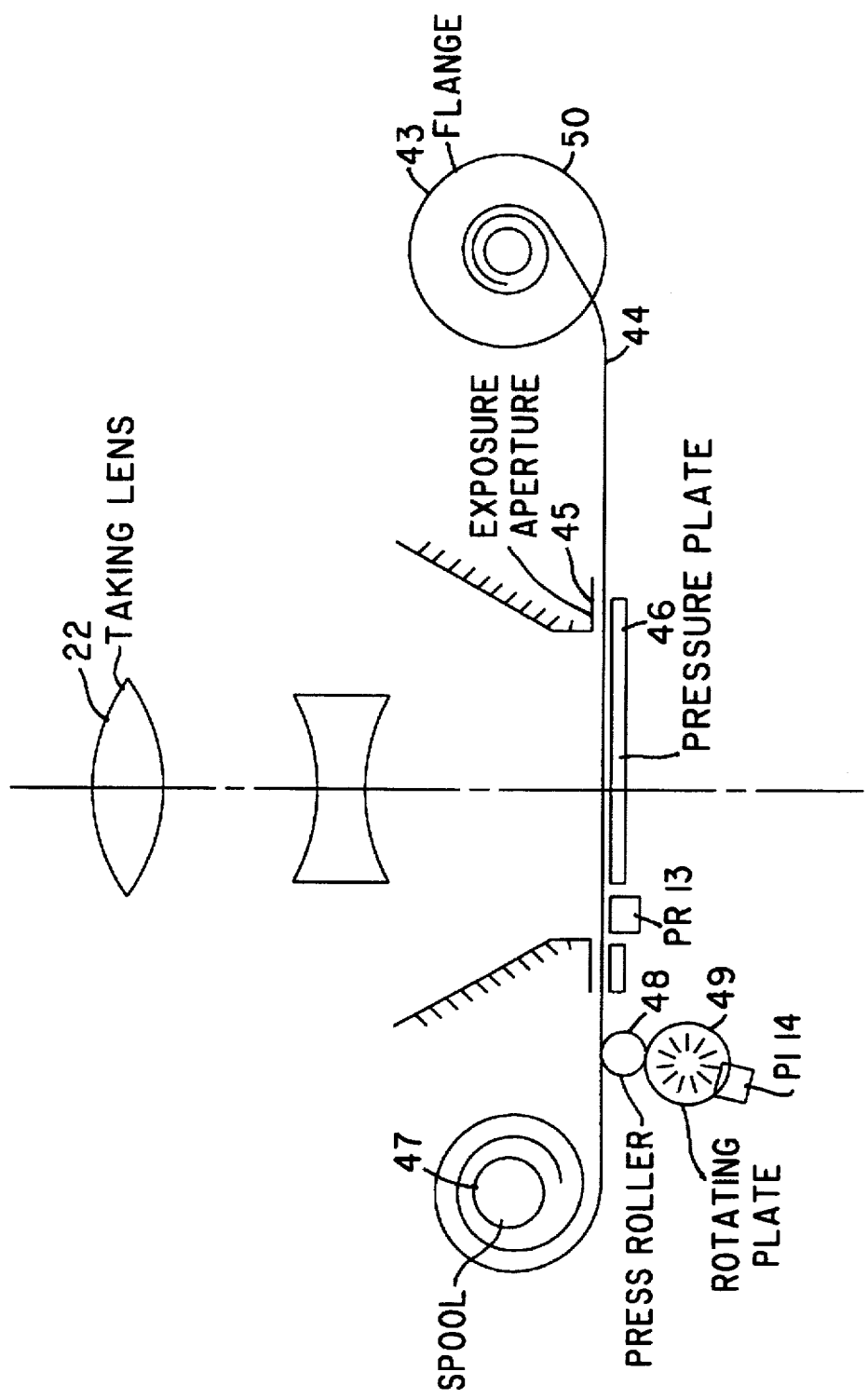
FIG. 2 is an illustration showing a layout of a perforation detecting photo-reflector and a film encoder of FIG. 1.

FIG. 2 shows a layout of a perforation detecting photoreflector 13 and a film encoder 14. As described above, a film cartridge 50 used in this embodiment has a function of feeding a film by rotating a spool shaft inside the film cartridge.

A film 44 which rotates integrally with flanges 43 of the film cartridge passes through an exposure aperture 45 and a pressure plate 46 formed in a camera and is wound around a spool 47. The perforation detecting photoreflector 13 is provided on the pressure plate 46, whereas the film encoder 14 is provided on the rotating plate 49 which is rotated via a press roller 48 touching the film 44. For detecting perforations, a photointerrupter may be used in place of the photoreflector, and for detecting the amount of rotation of the rotating plate 49 of the film encoder 14, a photoreflector may be used in place of the photointerrupter.

FIG. 3 schematically shows the concept of a first embodiment of this invention.

When a film is left for a long time in such a state as shown in FIG. 3(a), the flatness of an unexposed frame $44_2$ will deteriorate because of pressures applied to it by the flanges 43. Thus, when the camera remains unoperated for a long time, the film is rewound by two frames as shown in FIG. 3(b), so that the last exposed frame 44a will come to the position of the flanges 43. Accordingly, there is no problem even though the film is deformed.

Figure 4A:
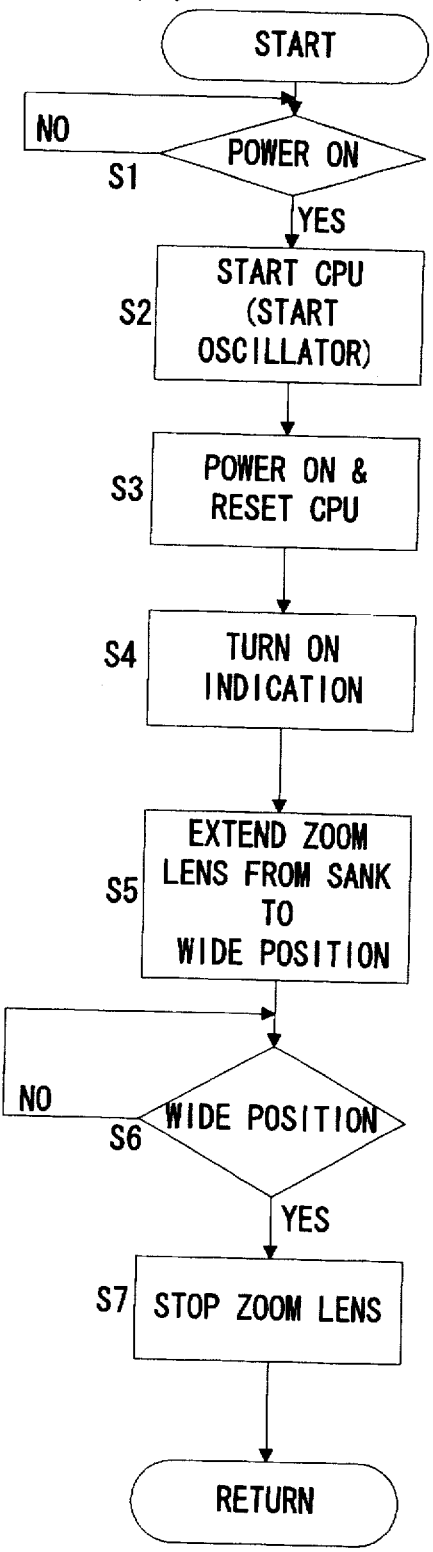
FIGS. 4(a) and 4(b) are flowcharts of common on and off operations of a power switch of the camera shown in FIG. 1.
Figure 4B:
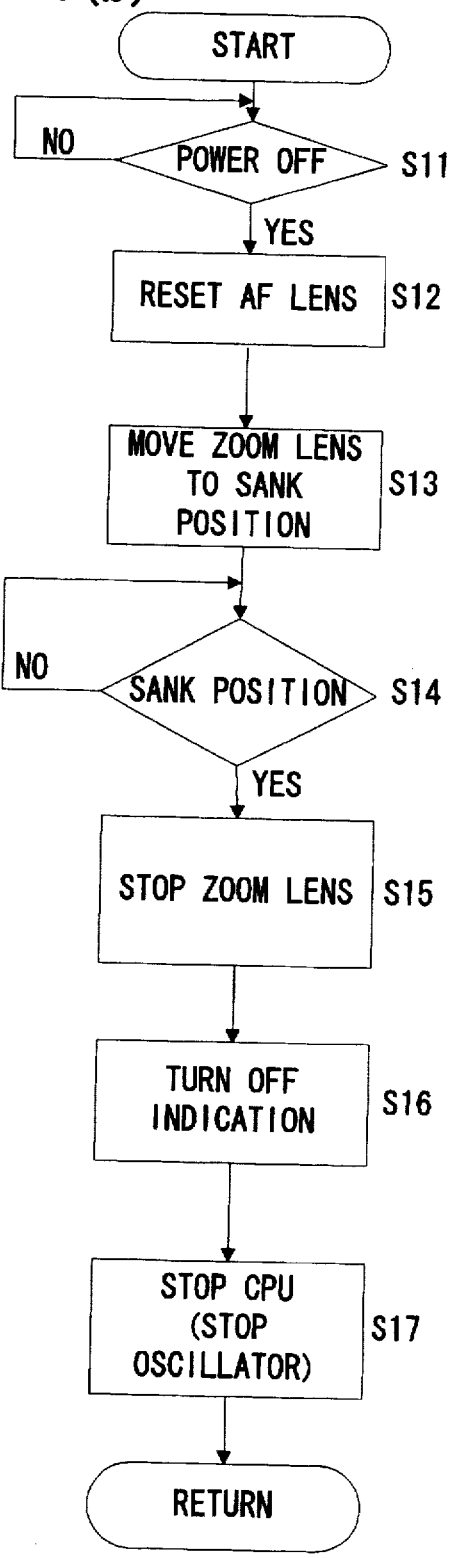

FIGS. 4(a) and 4(b) are flowcharts of on and off operations, respectively, of the power switch of the camera shown in FIG. 1.

In FIG. 4(a), when the power switch is turned on (step S1), an operation of the CPU is started (steps S2 and S3), and the indication is turned on (step S4). Next, the zoom lens is extended from its sank position to its wide position (steps S5 and S6), and will stop (step S7).

The off operation of the power switch shown in FIG. 4(b) (steps S22–S17) is the reverse of the on operation of the power switch of FIG. 4 (a). When the power switch is detected to be off (step 11), the AF motor 26 is driven (step S12) so as to move the AF lens (focusing lens) in the taking lens 22 to its reset position (usually the position corresponding to the infinite object distance). Then, the zoom motor 25 is driven (step S13) so that the whole taking lens 22 will move to its sank position. When the taking lens 22 reaches the sank position (steps 14), the drive of the zoom motor 25 and the AF motor 26 is stopped (step S15), the indication of the indicating element 30 is turned off (steps S16), and the oscillation of a clock for the operation of the CPU 16 is stopped so that its operation is stopped (step S17).

FIG. 5 is a flowchart of an initial winding-up operation of a film in the camera shown in FIG. 1.

With the power switch being on, when a film cartridge is loaded into the camera (step S21), and the housing lid is closed (step S22), the feeding motor will be reversed (step S23). Together with this, the rewind fork rotates the cartridge shaft in the rewinding direction to rotate a disk which is provided to the cartridge and on which a bar code is printed, and the bar code is read optically by the bar code detecting circuit 38 (step S24). In the bar code, film speed information and the number of frames are recorded.

When the bar code detection is over (step S25), the film feeding motor 11 will be turned off and then normally rotated (steps S26 and S27). At this time, because the rewind fork is also normally driven, the film 44 will be unreeled and will come out from the cartridge. When the front end of the film reaches a winding spool 47, because the rotation speed of the winding spool 47 is faster than that of the rotation speed of the rewind fork, spool drive is established and the film feeding is continued (steps S28 to S30).

When three perforations are detected by the perforation detecting photoreflector 13 (step S31), short-circuit braking will be applied to the motor (step S32). Subsequently, a timer is reset and then started to count time (step S33). Then a predetermined time has passed (step S34), the process proceeds to step S35 to turn off the film feeding motor 11 thereby to release the short-circuit braking. In this way, after the short-circuit braking is applied for a predetermined time, initial winding-up is finished.

Figure 6:
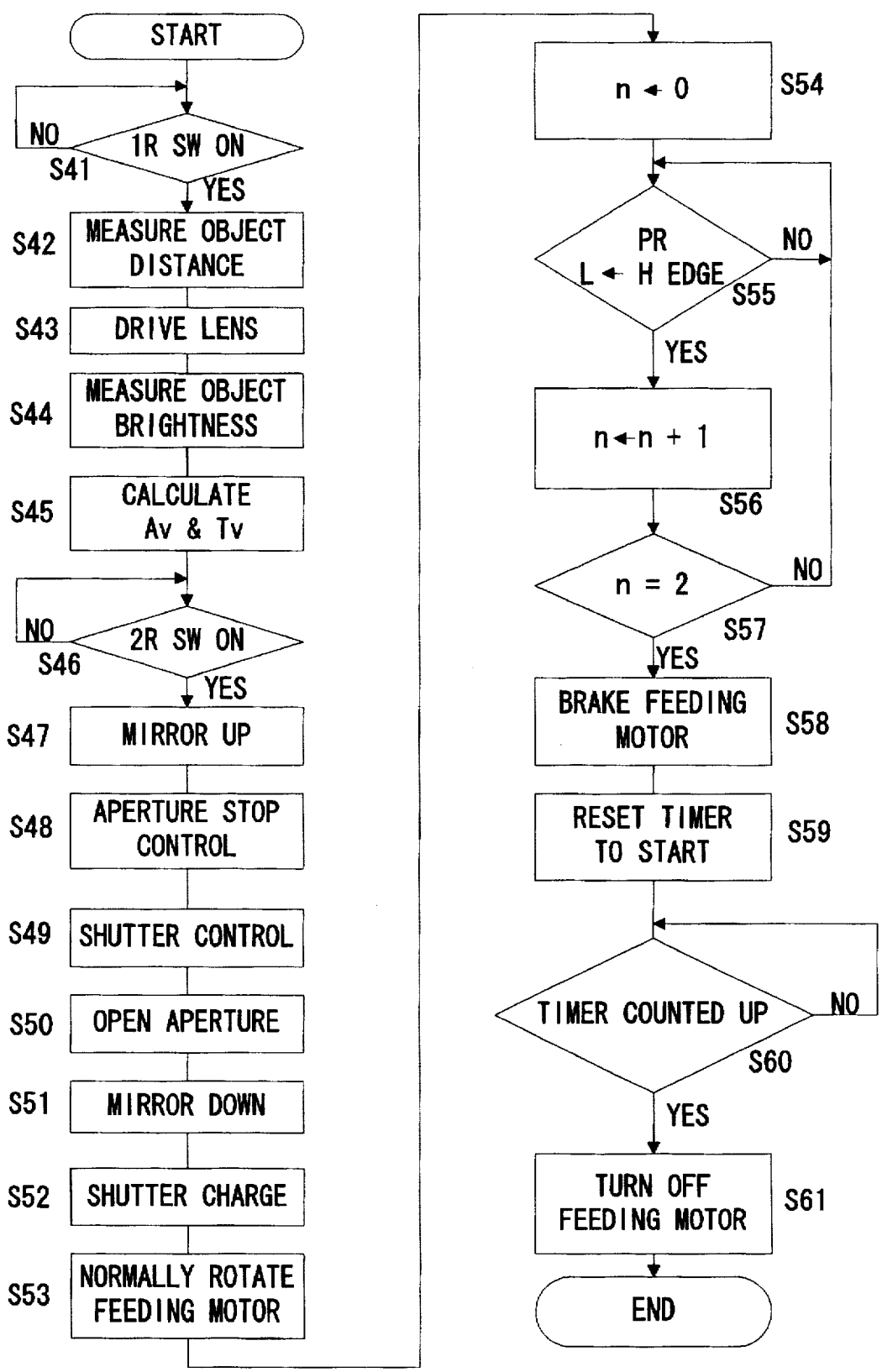
FIG. 6 is a flowchart of a common photographing operation of the camera shown in FIG. 1.

FIG. 6 is a flowchart of a common photographing operation of the camera shown in FIG. 1.

When the first release switch 40 is turned on (step S41), the AF sensor 37 measures the object distance (step S42), the taking lens 22 is driven on the basis of the measured distance (step S43), the object brightness is measured by the AE sensor 35 (step S44), and the Av (aperture value) and the Tv (shutter time value) are calculated by the exposure calculation circuit (step S45).

Then, when the second release switch 41 is turned on (step S46), the mirror 17 rises to change over the path of object light from the pentagonal prism 34 to the shutter 20 (step S47), and aperture stop control (step S48) and shutter control (step S49) are done. The film is exposed during the shutter control. After the film is exposed, the aperture is opened (step S50), mirror down (step S51) and shutter charge (step S52) are done, and the film feeding motor 11 is normally rotated to wind the film (step S53).

Until the photoreflector 13 detects two perforations, the film 44 is fed by the film feeding motor 11 being normally rotated (steps S54 to S57). When two perforations are detected (step S57), short-circuit braking is applied to the motor as in step 32 of FIG. 5 (step S58). Then the timer is reset and started to count time (step S59). When a predetermined time has passed (step S60), the short-circuit braking of the film feeding motor 11 is released (step S61).

Figure 7:
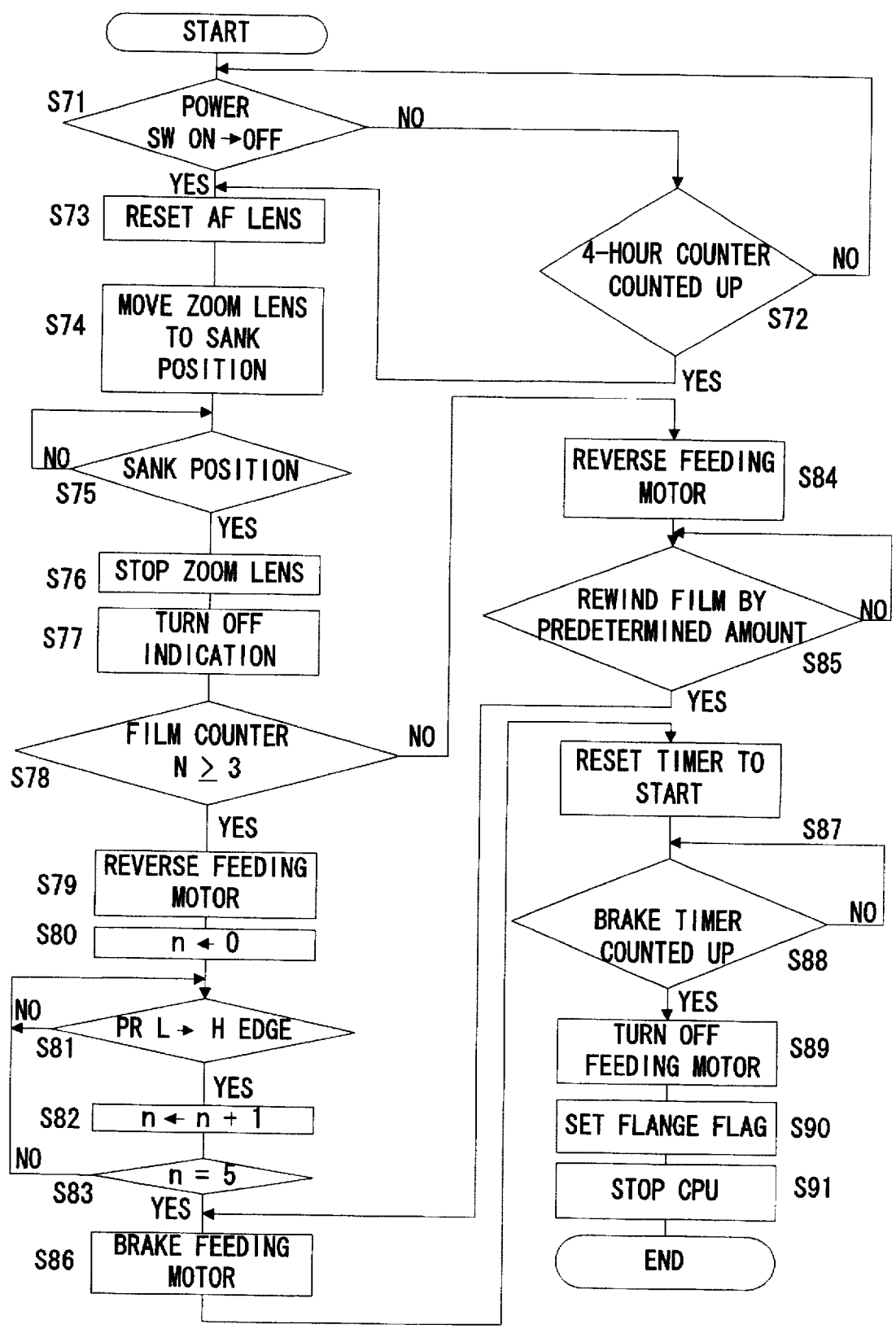
FIG. 7 is a flowchart of a film rewinding operation for removing film deformation owing to flanges.

FIG. 7 is a flowchart of a film rewinding operation for removing film deformation caused by the flanges. This flowchart is executed when the initial winding-up of the film shown in FIG. 5 has been done, and when the power switch 39 has been turned on for a predetermined time after the initial operation shown in FIG. 4(a) was performed.

When the power switch 39 is switched from on to off (step S71), or when a four-hour counter has counted up four hours while the power switch 39 remains on without any photograph being taken (step S72), the focusing lens in the taking lens 22 is returned to its initial position (step S73), then the whole taking lens 22 moves to its sank position (steps S74 to S76), and the indication will be turned off (step S77). The present time of the timer is not limited to four hours and may be any time if the film deformation by the flanges is negligible during that time.

If the count of the film counter for counting the number frames of the film 44 is three or more (step S78), the film feeding motor 11 is reversely rotated (step S79) to rotate the rewind fork reversely so that the film 44 is moved in the direction in which it is wound into the cartridge. In this case, the film 44 moves by about two frames, namely five perforations as shown in FIG. 3 (steps S80 to S83).

If the film is rewound by two frames when the count of the film counter is less than three, the area of the film having no perforations will come to the photoreflector 13. Therefore, in that case, after the film feeding motor 11 is reversely rotated (step S84), the film is rewound by about two frames on the basis of the signal from the film encoder 14 (step S85).

Thus, an exposed frame (44a in FIG. 3(b)) will receive pressure from the flanges 43 in the film cartridge.

Subsequently, similar to steps S32 et seq. of FIG. 5, braking is applied to the film feeding motor 11 (step S86), an operation for counting time starts after the timer is reset (step S87), and the film feeding motor 11 turns off (step S89) when the brake timer has counted up to a predetermined value (step S88). Finally, a flange flag is set (step S90) to indicate that the film has been rewound in order to prevent deformation of the film, and the CPU is stopped (step S91).

Figure 8:
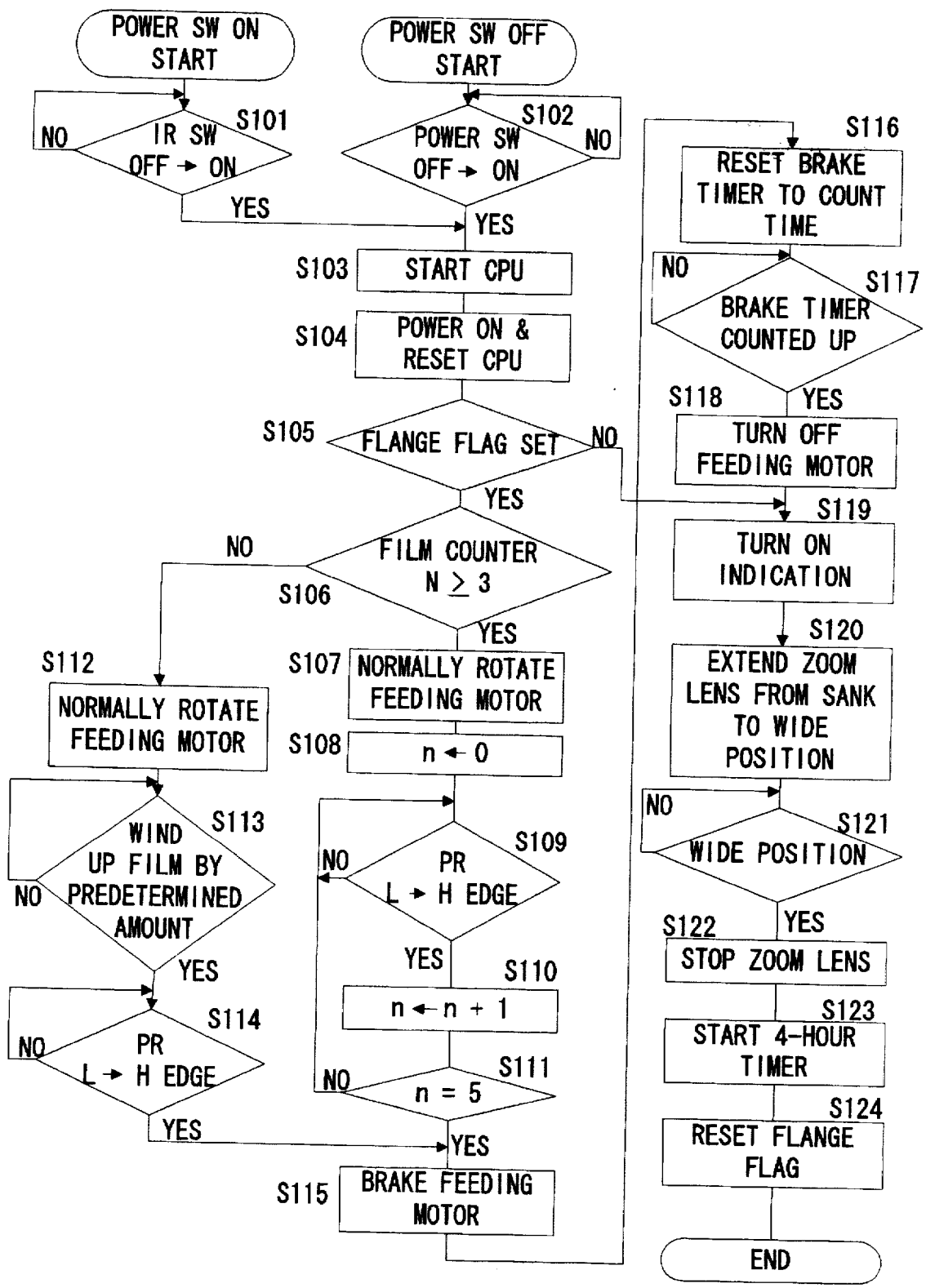
FIG. 8 is a flowchart of an operation for returning a film rewound by two frames to its former position.

FIG. 8 is a flowchart of an operation for returning the film rewound by two frames to its former position.

If the first release switch 40 switches from off to on (step S101) while the power switch 39 is on and the four-hour timer is counting up, or if the power switch 39 switches from off to on (step S102), the CPU 16 is started (steps S103 and S104), and it is checked whether the flange flag is set or not (step S105). If the film has been rewound to prevent its deformation, the flag has been set at step S90 of FIG. 7.

When the flag has been set, if the number of frames of the film 44 is three or more (step S106), the film feeding motor 11 is normally rotated (step S107) to rotate the rewind fork normally. That is to say, the film 44 is moved toward the winding spool 47 by about two frames, namely by five perforations (steps S108 to S111).

When the number of frames of the film is less than three, the film feeding motor 11 is normally rotated (step S112), to wind up approximately two frames on the basis of the signal from the film encoder 14 (step S113). Then, a pulse edge is detected by the perforation detecting photoreflector 13 (step S114).

Subsequently, short-circuit braking is applied to the film feeding motor 11 (step S115), and a timing operation is started after the brake timer is reset and then started to count time (step S116). When the brake timer is counted up to a predetermined value (step S117), the film feeding motor 11 is turned off (step S118).

Thus, the film feeding motor 11 is normally rotated to wind up the rewound amount of the film 11 with the winding spool 47 so that an unexposed portion of the film 44 is set to the exposure aperture of the camera.

After the indication is turned on (step S119), the zoom lens is extended from its sank position to its wide position (steps S120 to S122). Finally, the four-hour timer is reset and started (step S123), the flange flag is reset (step S124), and the photographing preparation operation is completed.

Figure 9A:
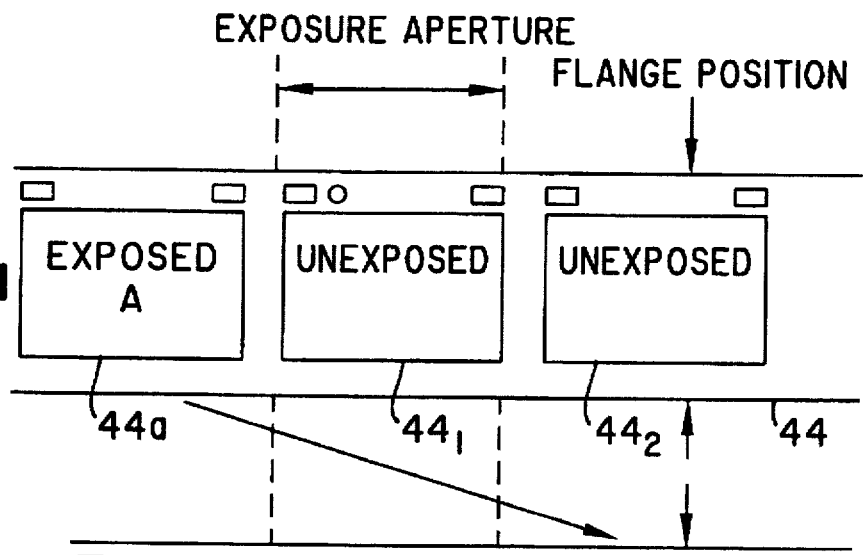
FIGS. 9(a), 9(b), 9(c), and 9(d) are illustrations showing variations 1 and 2 of the first embodiment of this invention.
Figure 9B:
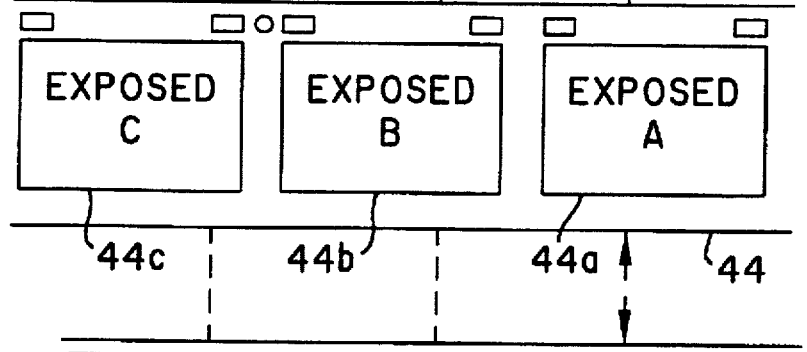

FIGS. 9(a) to 9(b) show variations of the first embodiment of this invention. In the figure, "exposed" and "unexposed" represent exposed and unexposed frames, respectively.

In the above described embodiment, an example of film rewinding by two frames from the position shown in FIG. 9(a) to the position shown in FIG. 9(b) was described. However, this is not the only example.

Figure 9C:
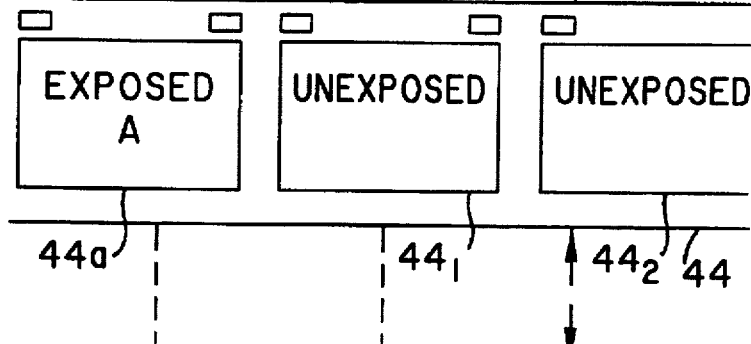

For example, in variation 1 shown in FIG. 9(c), the film can be stopped based on an output pulse of the film encoder 14 so that a perforation will come right to the position where the flanges are.

In this way, the moving amount of the film will be less than that of the embodiment shown in FIG. 9(b). Therefore, because the moving amount is little when the power switch is turned on, it is not necessary to wait so long. Also, the amount of deformation will be less because of the existence of the perforations.

Figure 10:
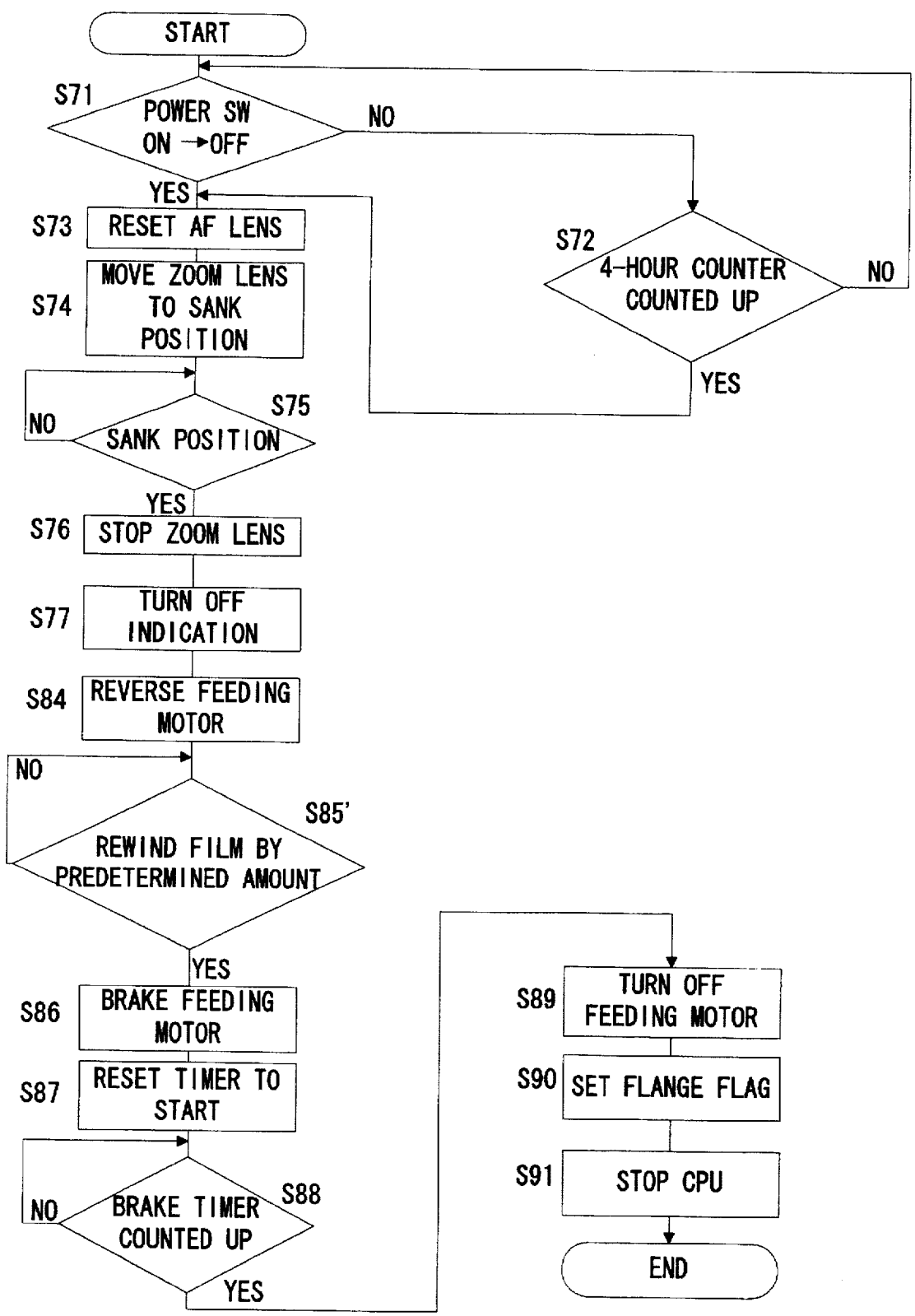
FIG. 10 is a flowchart of an operation variation 1 of the first embodiment.
Figure 11:
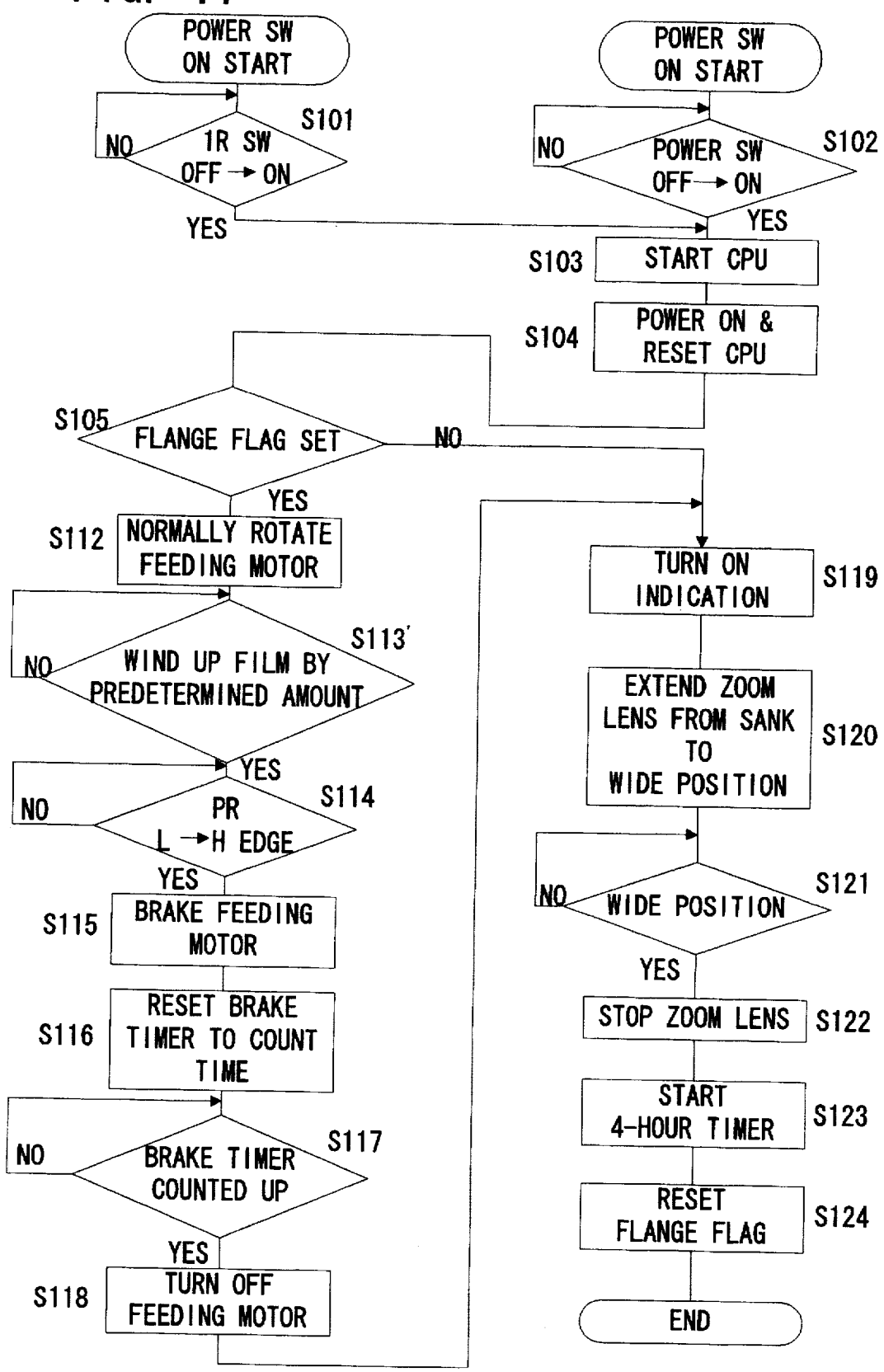
FIG. 11 is a flowchart of an operation variation example 2 of the first embodiment.

The structure for implementing this variation 1 is the same as that of FIG. 1, and the flowcharts of FIGS. 7 and 8 will be replaced with those shown in FIGS. 10 and 11. In the flowchart of FIG. 7, it is decided at step S78 whether the count of the film counter is three or more, and then according to the decision, it is decided whether to proceed to step S79 or step S84. However, in this variation 1, as shown in FIG. 10, steps S79 to S83 of FIG. 7 are not necessary because it is sufficient to rewind the film to the position where the perforation is. In this variation 1, the feeding motor 11 is reversely rotated at step 84 to start film rewinding. On the basis of the signal from the film encoder 14, it is detected whether the perforation for detecting the amount of feeding of the film has reached near the film passageway of the film cartridge (step S85'), and when the perforation has reached the film passageway, braking is applied to the feeding motor 11. Other operations are the same as those of the flowchart of FIG. 7, and the same operations are given the same reference numerals as in FIG. 7 and their explanations are omitted.

FIG. 11 shows a flowchart of winding up again, at the time of photographing, the film rewound to prevent the film deformation. In the flowchart of FIG. 8, it is determined at step S106 whether the count of the film counter is three or more, and according to the result of the determination, it is decided whether to advance to step S107 or to step S112. However, in variation 1, steps S107 to S111 are not necessary. In this variation 1, the feeding motor 11 is normally rotated at step S112, to start film winding. On the basis of the signal from the encoder 14, it is detected that the film has moved to the position where it was before rewinding (step S113'). When the signal from the film perforation detecting photoreflector 13 is detected (step S114), the feeding motor 11 is braked. Other operations are the same as those of FIG. 8, and the same operations are given the same numerals as in FIG. 8, and their descriptions will be omitted.

Figure 9D:
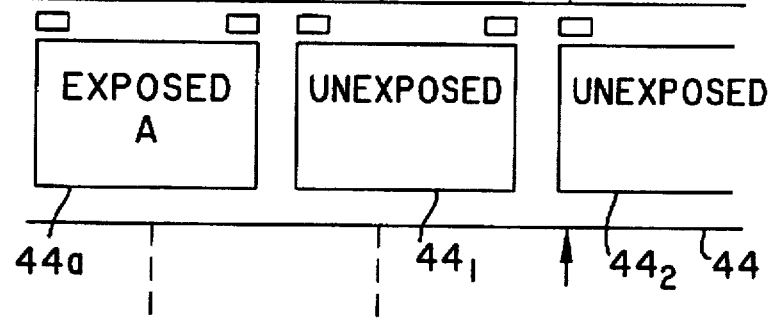

FIG. 9(d) shows variation 2 in which the film is moved so that the flanges are between the frames. Variation 2 adopts the same construction as variation 1 shown in FIG. 9(c). However, in this variation, the "predetermined amount" at step S85' in FIG. 10 and at step S113' in FIG. 11 is an amount by which the film is moved on the basis of the signal from the film encoder 14 until the portion between the frames of the film comes near the film passageway of the film cartridge, which is different from variation 1.

By controlling the moving amount of the film in this way, the effects of deformation on the frames will be less than those of the embodiment shown in FIG. (b). Also, there is the advantage that latent image fading will be hardly caused in the frames by the flanges even if the film is left for a long time.

The film deformation remains over and under the exposed frame in the first embodiment, in the perforation portion in variation 1, and between the perforations in variation 2. Therefore, a second embodiment for removing the deformation of the film will be described.

Figure 12:
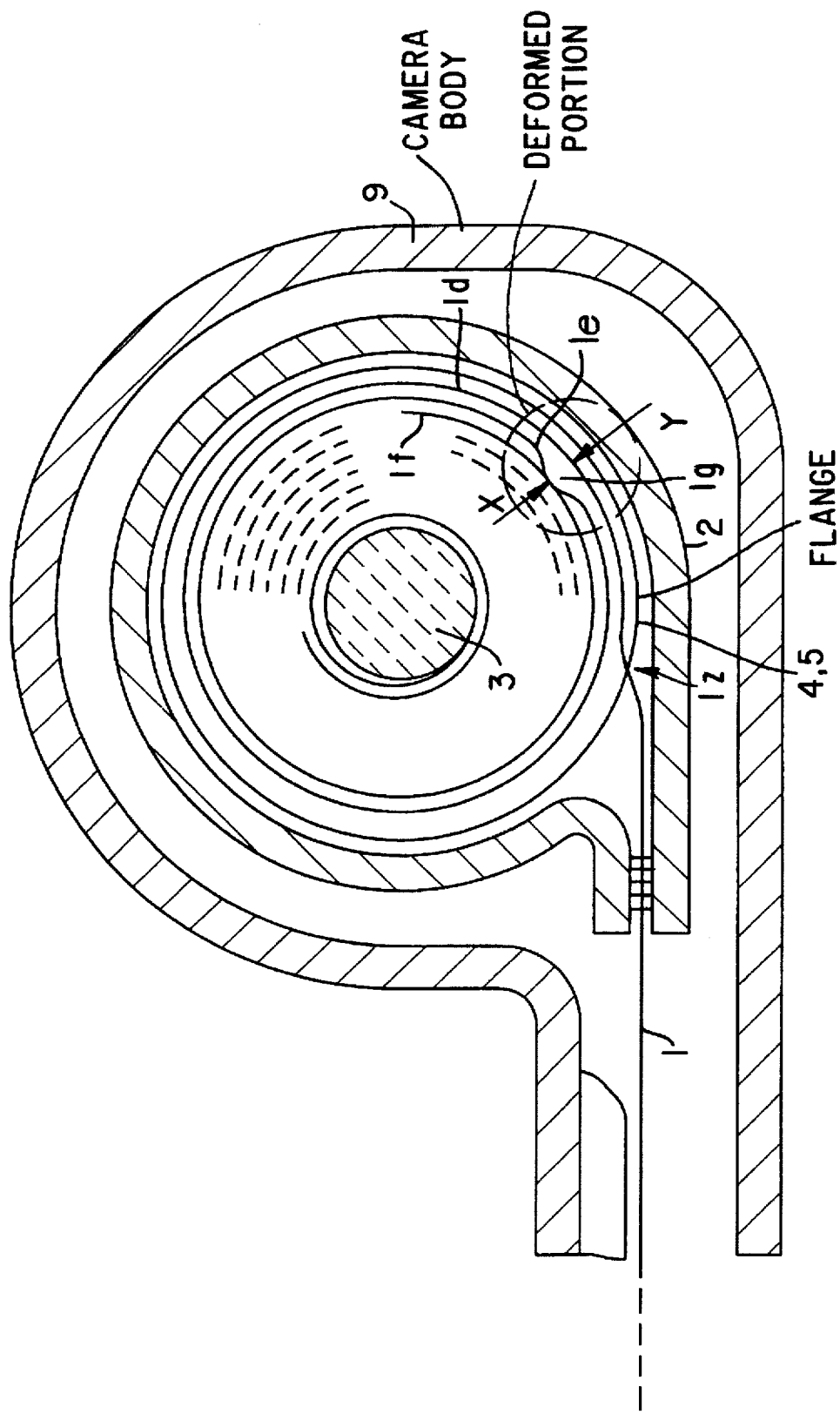
FIG. 12 is a partial cross-sectional view of a camera and a film cartridge showing a concept of second to fourth embodiments of this invention.

First, a basic concept of removing the deformation will be described with reference to FIGS. 12 and 13. FIG. 12 is a partial cross-sectional view of a camera body 9 with a film cartridge 2 loaded. A film portion 1z touching flanges 4 and 5 will be deformed if it is left for a long time. The deformed portion will be rewound into the cartridge 2 by reversely driving a spool 3 at a predetermined timing. The deformed portion 1g of the film will be sandwiched between film portions 1d and 1f which are not deformed, receiving. pressures from directions indicated by arrows X and Y in the drawing, and the deformed portion will be corrected.

Thus, in this concept, the deformed portion is corrected in such a manner that the deformed portion is sandwiched by the film 1 from both sides and that the forces caused by the winding are applied. However, as in FIG. 13, deformation may be corrected such that only one side of a deformed portion 1j touches a film portion 1i which is not deformed. In this case there is the advantage that the amount of rewinding the film into the cartridge 2 is little. The deformed portions 1g and 1j of FIGS. 12 and 13 are exaggerated so that they can be easily recognized. The concepts of the second embodiment are the same as those of below-mentioned third and fourth embodiments.

Figure 14:
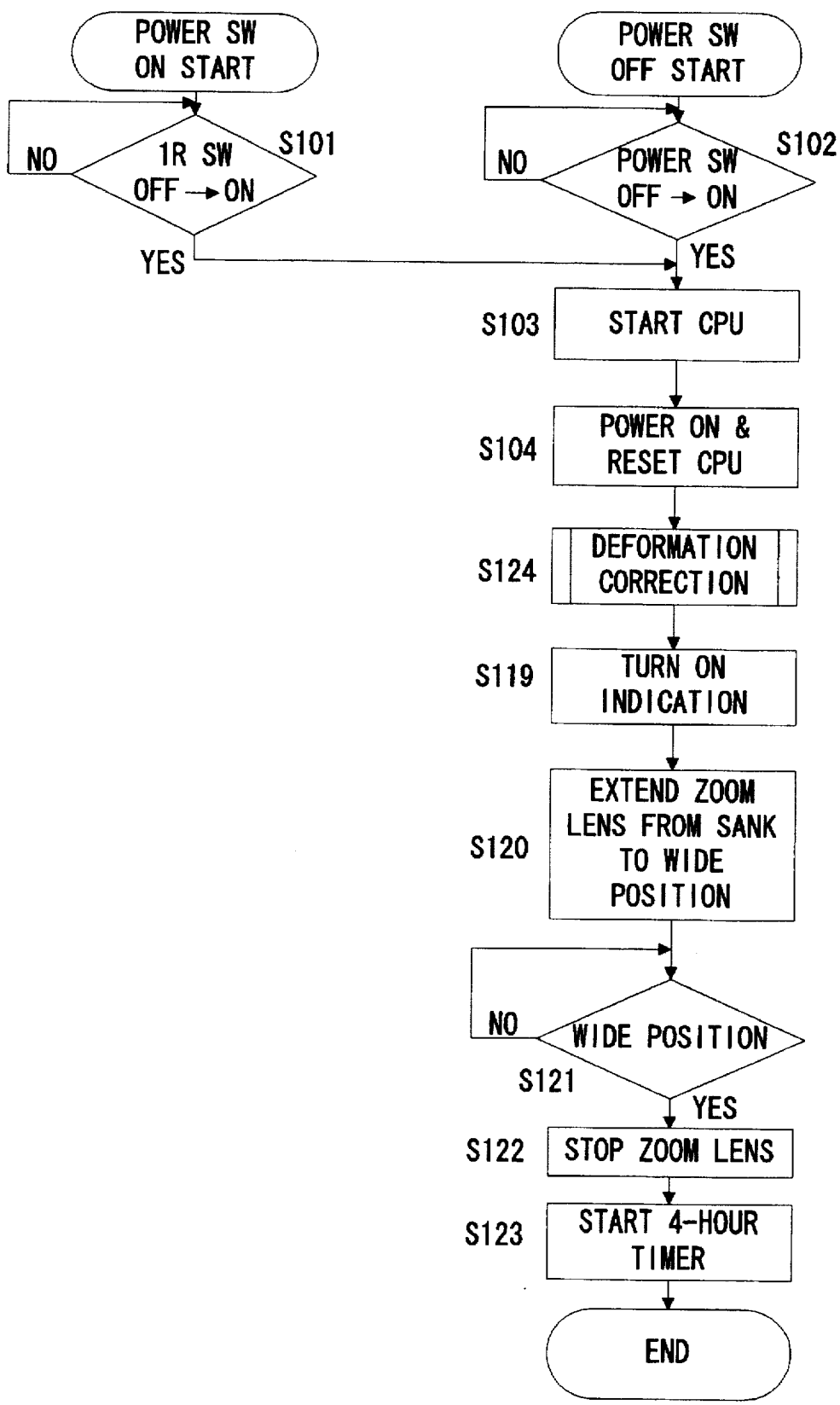
FIG. 14 is a flowchart of an operation of the second embodiment of this invention.
Figure 15:
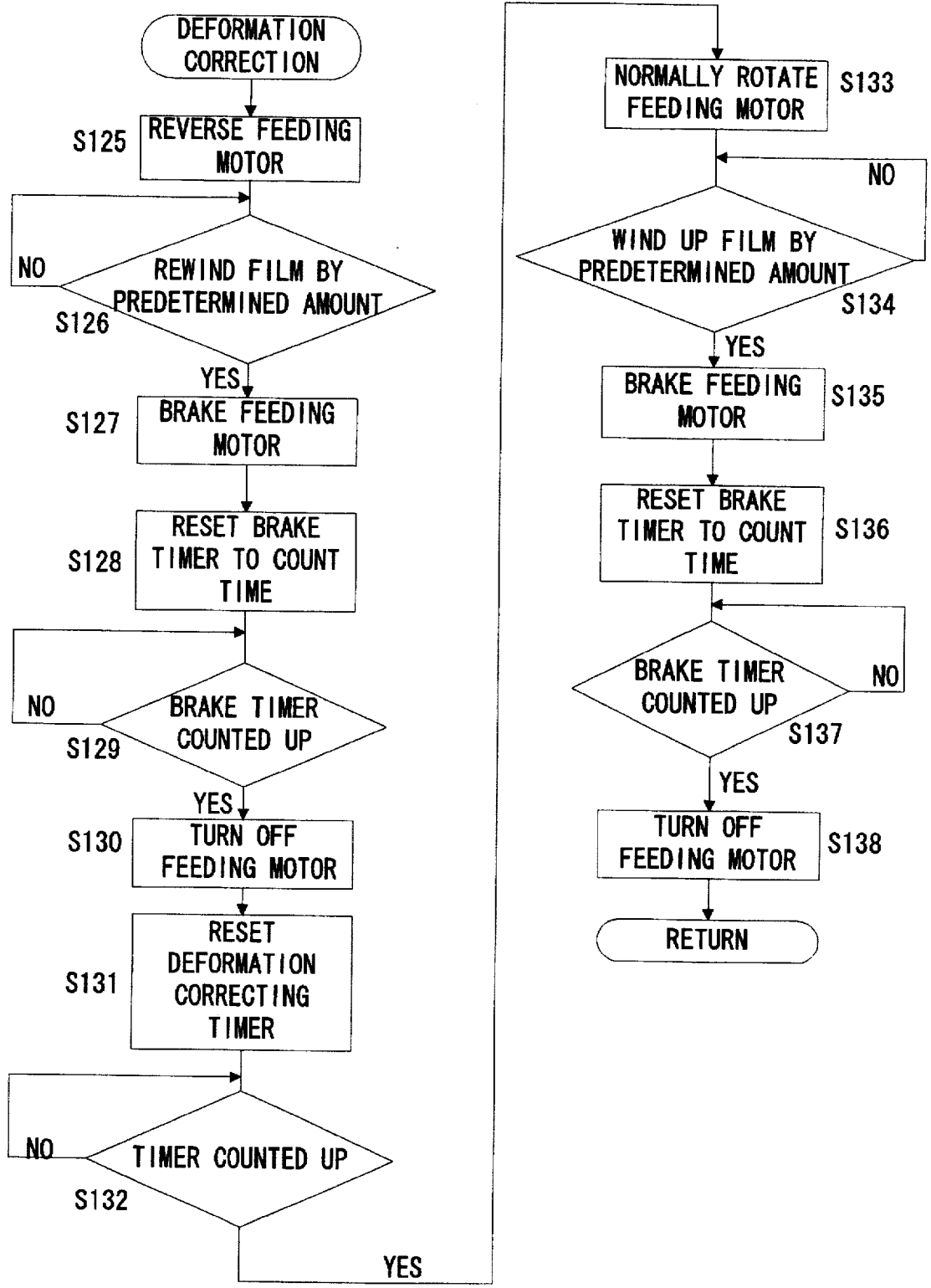
FIG. 15 is a flowchart of the subroutine "deformation correction" in FIG. 14.

Next, a specific constitution of the second embodiment will be described with reference to FIGS. 14 and 15. In the second embodiment, the predetermined timing of rewinding the deformed film is at the time of a preparing operation for photographing, that is, the turning on of the power switch 39, or the turning on of the first release switch 40 due to the half pushing of the release button.

The hardware structure of the second embodiment is the same as that of FIGS. 1 and 2. In such a structure, when the first release switch 40 is turned on (step S110) while the power switch 39 remains on without being operated for a long time, or when the power switch 39 is switched from off to on (step S102), a clock is provided to the CPU 16 to start it (step S103), and the CPU is powered on and reset (step S104). Next, at step S124, an unexposed frame having deformed portions over and under the frame is rewound into the cartridge 2 to correct the deformation (details are described below). After the correction of the deformed portion is finished, at steps S119 et seq., the indication of the camera is turned on and the zoom lens is moved from its sank position to its wide position. However, detailed descriptions of the steps will be omitted because they are similar to those of steps S4 to S7 of FIG. 4(a). As a preparing operation for photographing, the first release switch 40 is detected at step S101. However, an operation of a manually operated switch such as a mode setting switch may also be detected.

Next, referring to FIG. 15, a subroutine of deformation correction of step S124 will be described. First, the film feeding motor 11 is reversely rotated to rewind the film 1 into the cartridge 2 (step S125). When the rewinding is done, the film encoder 14 detects the rewound amount of the film and compares the detected rewound amount of the film with a predetermined amount (step S126). When the rewound amount is equal to the predetermined amount, short-circuit braking is applied to the film feeding motor 11 (step S127), and the brake timer is reset and started to count time (step S128). When a predetermined time has passed, the timer counts up to a predetermined value (step S129), and the feeding motor 11 is turned off (step 130) thereby to release the braking. Namely, short-circuit braking is applied to the motor for the predetermined time at steps S127 et seq.

Thus, the film is rewound into the cartridge 2 in order to correct the deformed portion, and the amount of rewinding is determined by the predetermined amount of step S126. The predetermined amount is properly selected as a design value, and the rewound state inside the cartridge 2 changes according to the remaining amount of the film, the amount of rewinding, and the film feeding system. For example, when the number of frames to be photographed (the number of unexposed frames) is small and the rewinding amount is large (namely, when the predetermined amount is relatively large), the state becomes similar to that of FIG. 12: the winding spool 47 and the cartridge spool 3 puts the film 1 into a strained state, and the deformed portion 1g of the film tightly coils around the cartridge spool 3 via the rewound film. When there are many unexposed frames and the rewinding amount is small (namely, when the predetermined amount is relatively small), the state becomes similar to that of FIG. 13: the film will loosely coil around the spool and the wound portion 1i of the film will correct the deformed portion 1j of the film.

Figure 13:
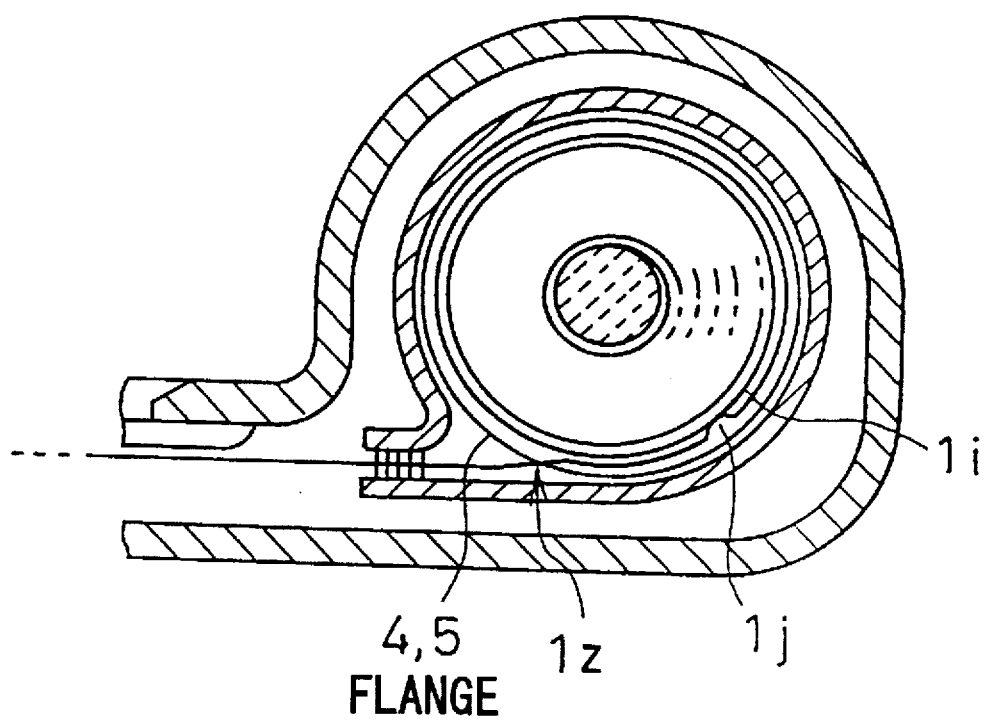
FIG. 13 is a partial cross-sectional view of a camera and a film cartridge showing another concept of second to fourth embodiments of this invention.

Next, in order to correct the deformation remaining in the film 1, the states shown in FIGS. 12 and 13 are maintained for a predetermined time. For this purpose, in step S131, a timer for counting the time of deformation correction is reset and the counting operation of the timer is started. When the predetermined time necessary for removing the deformation remaining in the film 1 has passed, the timer counts up to a predetermined value (step S132), the feeding motor 11 is normally rotated (step S133) in order to wind up the rewound amount of the film and return it to its initial position. When it is detected on the basis of the output from the encoder 14 that the film has been wound up by an amount equal to the predetermined amount of step S126 (step S134), short-circuit braking is applied to the feeding motor 11 for a predetermined time (steps S135 to S138), and the process returns to the routine of FIG. 14.

In this way, in the second embodiment, the deformation caused by the flanges 4 and 5 and remaining in the film can be corrected.

Figure 16:
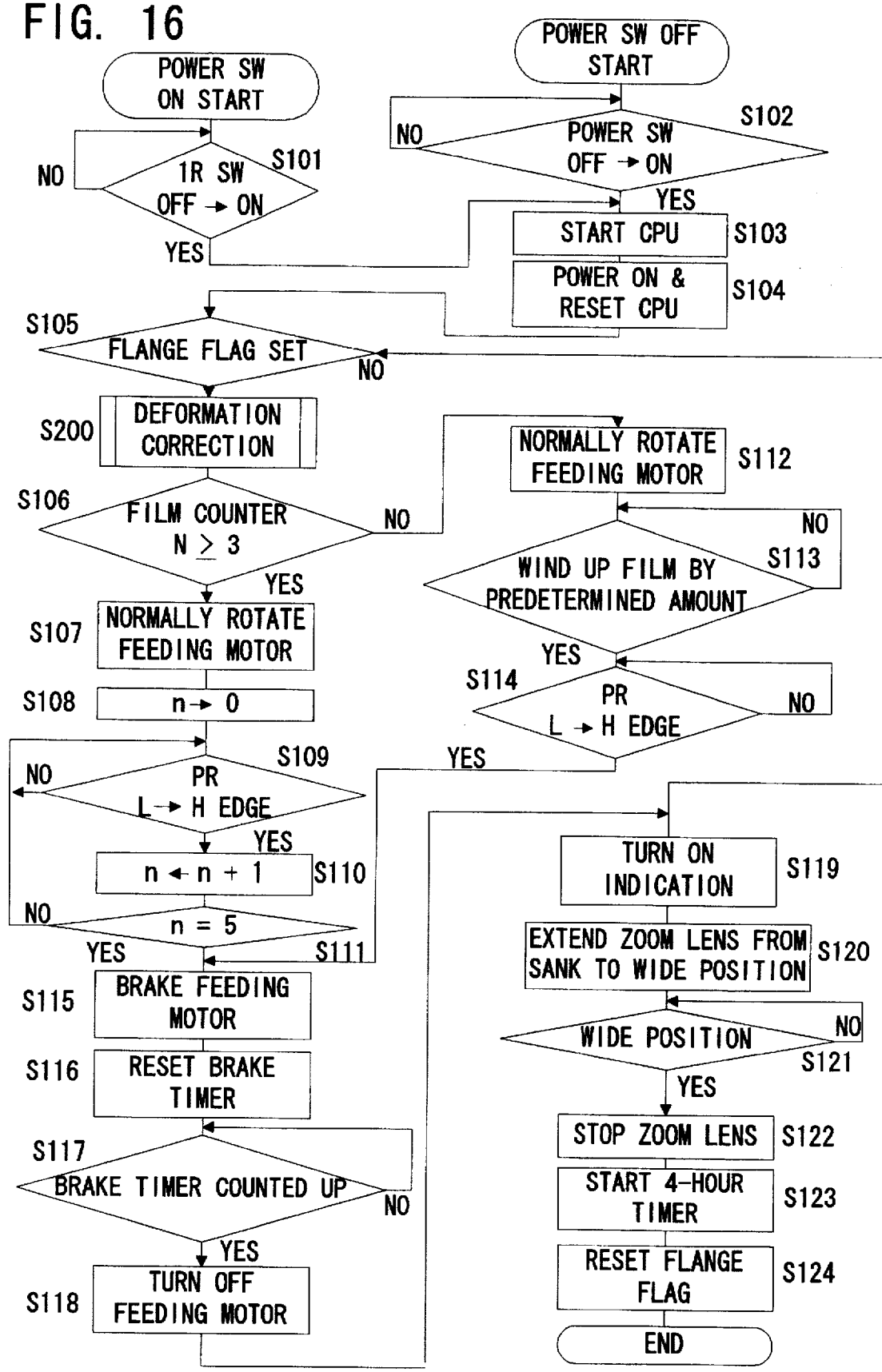
FIG. 16 is a flowchart of an operation of the third embodiment of this invention.

In the second embodiment, an example of correcting film deformation of an unexposed frame had been described. However, the film deformation described in the first embodiment and its variations may also be corrected and an example of such correction will be described as a third embodiment. The third embodiment also adopts the hardware structure shown in FIGS. 1 and 2 and uses the flowchart of FIG. 16 instead of the flowchart of FIG. 8. The flowchart of FIG. 16 is the same as that of FIG. 8, except for the subroutine of deformation correction of step S200, and thus its detailed description will be omitted. In step S105, it is determined whether the film feeding has been made to prevent the deformation of the frame which is to be photographed. If the film feeding has been made, the subroutine of deformation correction described in FIG. 15 is executed to correct the deformed portion of the film and then step S107 and the following steps will be executed.

In the third embodiment, the remaining deformation of the film is situated where the influence of the deformation is small such as in an exposed frame, between perforations of unexposed frames, or between unexposed frames. In addition, the deformation is corrected to be flat. Thus, in the third embodiment, the film is flat even after its development, and is not deformed at the time of printing so that sharp printing can be made.

Figure 17:
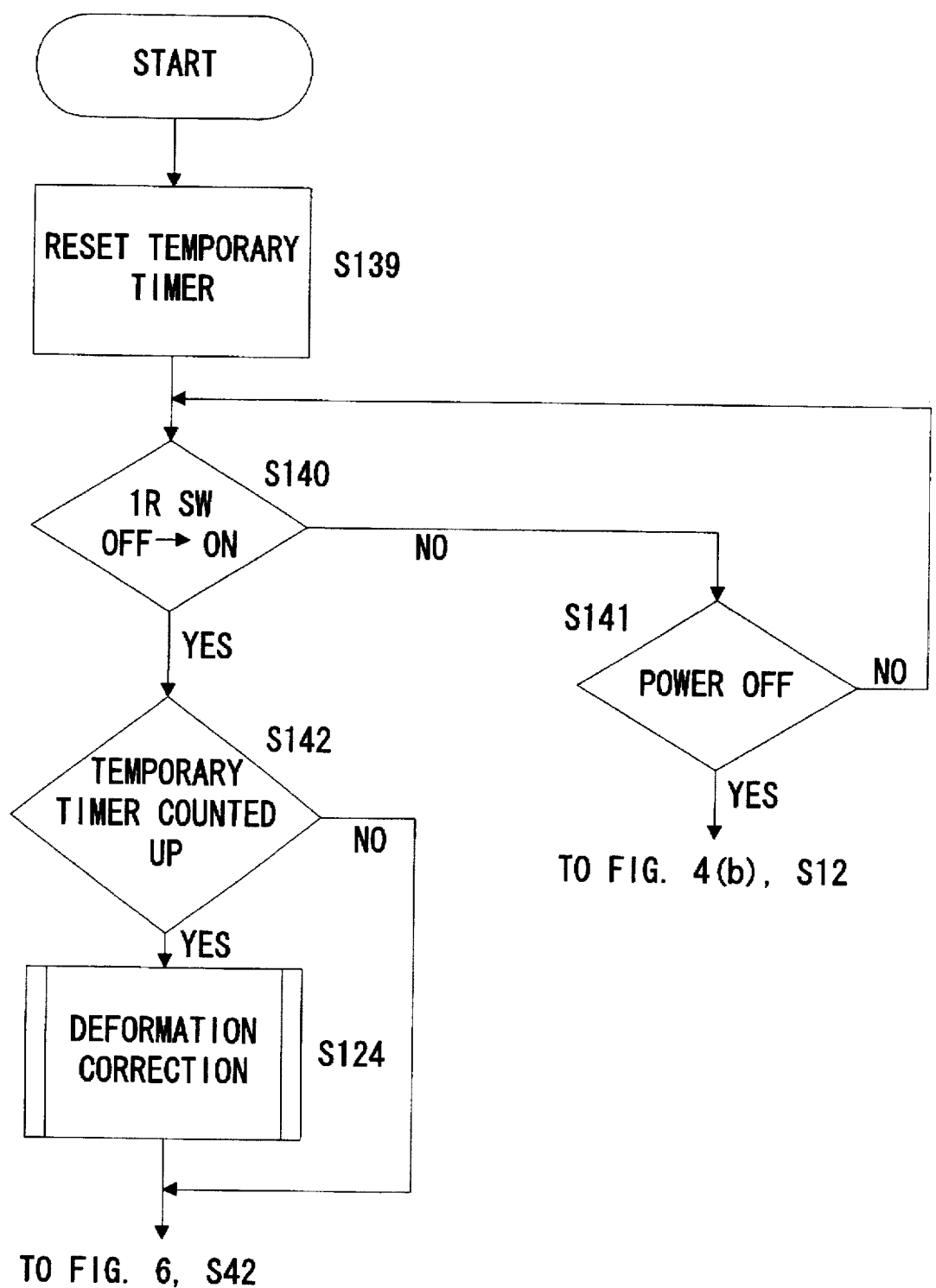
FIG. 17 is a flowchart of an operation of the fourth embodiment of this invention.
Figure 18:
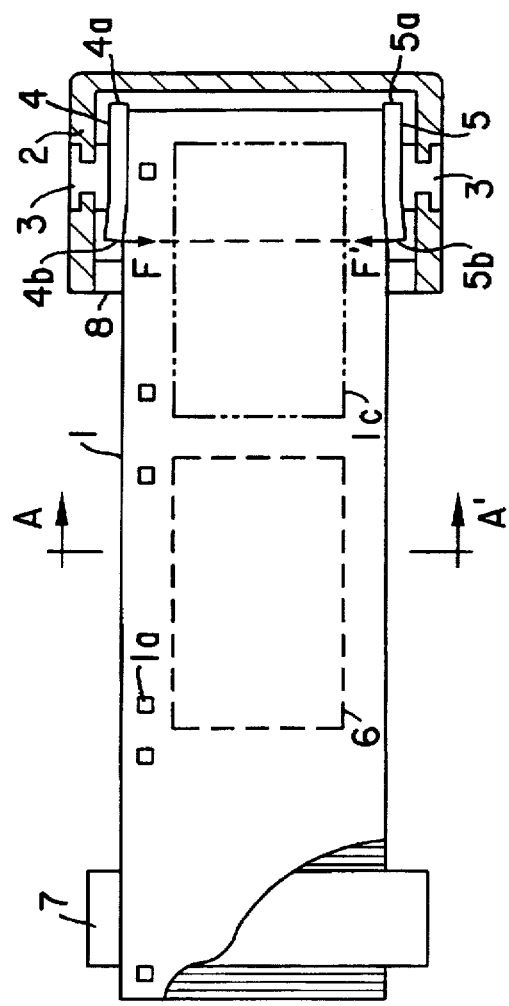
FIG. 18 is an illustration showing the state of a film when a film cartridge containing the film having a magnetic recording portion is loaded into a camera.
Figure 19B:
FIGS. 19(a) and 19(b) are cross-sectional views of the film of FIG. 18 in its width direction.
Figure 19A:
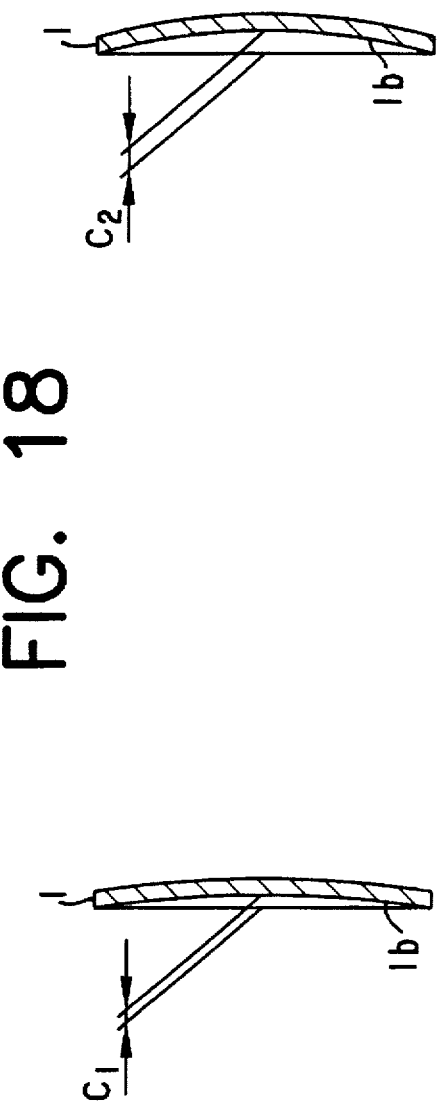
Figure 20A:
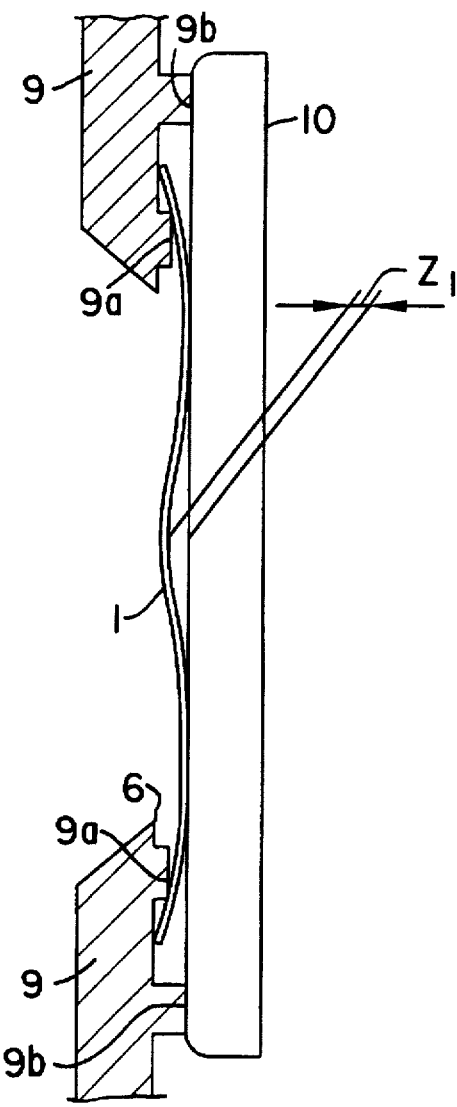
FIGS. 20(a) and 20(b) are cross-sectional views taken along line A–A' of FIG. 18.
Figure 20B:
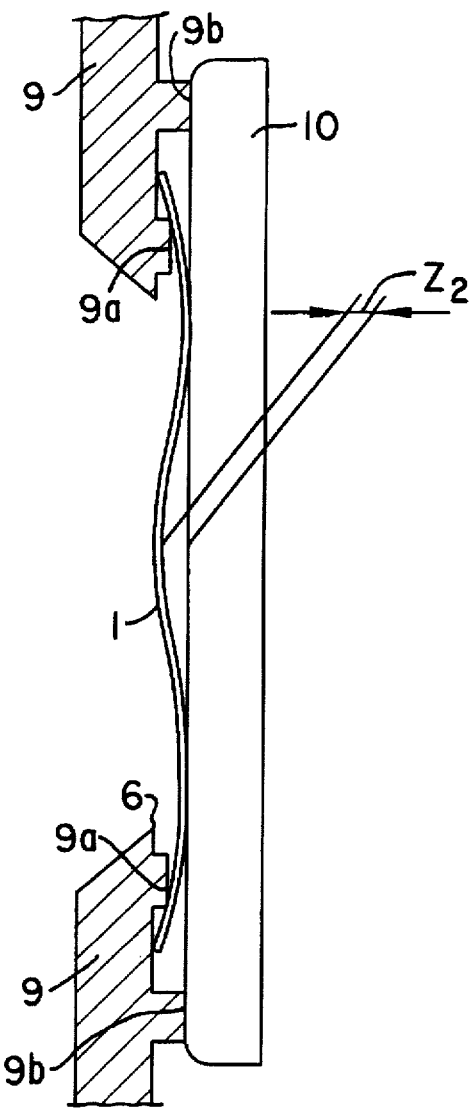

Next, a fourth embodiment of this invention will be described with reference to FIG. 17.

The fourth embodiment also adopts the hardware structure shown in FIGS. 1 and 2. In FIG. 17, when the CPU 16 is powered on and reset or the power switch 39 is turned on, a temporary timer is set (step S139). It is detected whether the first release switch 40 has been operated and switched from off to on (step S140). If the first release switch remains off, it is detected whether the power switch 39 has been turned off (step S141). If the power switch 39 is on, the process returns to step S140, whereas if the power switch 39 is off, the process returns to step S12 in FIG. 4(b) to execute the operation of turning off the power switch. If it is detected in step S140 that the first release switch 40 has been switched from off to on, it is determined whether the temporary timer has counted up to a predetermined time (step S142). If the counted time of the timer has exceeded the predetermined time, the subroutine of FIG. 15 for deformation correction is executed to correct the deformed portion of the film. If the time has not exceeded the predetermined time, the subroutine of deformation correction is not executed, and the process proceeds to step S42 in FIG. 6 to perform usual operations such as distance and light measuring.

The predetermined time compared with the counted time of the temporary time is, for example, about three minutes. However, it may be any time which is shorter than the preset time of the timer used in step S72 of FIG. 7 in the first embodiment (four hours in this case). Although in step S140 the operation of the first release switch 40 is detected, the operation of a manual switch such as a mode switch may also be detected. According to the fourth embodiment, the film deformation is corrected each time the manual switch is operated, so that even if the film is deformed for a little while, the film can be corrected, thereby improving the flatness of the film.

Thus, this invention can prevent an out-of-focus photograph due to film deformation caused by the cartridge flanges when the film has been left in the camera for a long time.

What is claimed is:

1. A film feeding apparatus of a camera into which a film cartridge containing a film and having a film feeding function can be loaded, the film feeding apparatus comprising:

film feeding means for feeding the film;

feeding amount detecting means for outputting a signal corresponding to a feeding amount of the film fed by the film feeding means;

first control means for controlling the film feeding means to feed the film in a first direction by a predetermined amount in response to the output signal of the film feeding amount detecting means when the camera is switched to a nonoperative state or when the camera has not been operated for a predetermined time; and second control means responsive to the camera being switched to an operative state or to an input of an operation command, for controlling the film feeding means to feed the film in a second direction opposite to the first direction of the film feeding controlled by the first control means, whereby a deformed portion of the film caused by the film cartridge does not affect the flatness of the film at the time of photographing.

2. A film feeding apparatus of a camera according to claim 1, wherein the first control means rewinds the film by the predetermined amount.

3. A film feeding apparatus of a camera according to claim 1, wherein the camera has a power switch, and the first control means determines that the camera is switched to the nonoperative state when the power switch is turned off.

4. A film feeding apparatus of a camera according to claim 1, wherein the camera has a release switch for release operation, and the second control means determines that the operation command is input when the release switch is operated.

5. A film feeding apparatus of a camera according to claim 1, wherein the camera has an operating member and a timer for counting time starting from a first operation of the operating member, the timer being reset by a second operation of the operating member to restart the counting, and the first control means controls the film feeding means to feed the film when the first control means decides on the basis of the counting value of the timer that no operation has been done for the predetermined time.

6. A film feeding apparatus of a camera according to claim 1, wherein the first control means detects the number of frames of the film before the film is fed for the predetermined amount, and if the detected number of frames is less than a predetermined number, the film is fed by an amount which is less than the predetermined amount.

7. A film feeding apparatus of a camera according to claim 1, wherein the apparatus has memory means for storing a flag indicating that the first control means has performed the feeding control of the predetermined amount, and the second control means controls the film feeding if the flag is stored in the recording means.

8. A film feeding apparatus of a camera according to claim 1, wherein the second control means controls the film feeding means to feed the film by an amount which is equal to the feeding amount controlled by the first control means.

9. A film feeding apparatus of a camera according to claim 1, wherein the feeding amount detecting means can detect at least the feeding amount corresponding to the number of frames of the film, and the first control means controls the film feeding means to feed the film by an amount corresponding to a predetermined number of frames.

10. A film feeding apparatus of a camera according to claim 1, wherein the first control means controls the film feeding means to feed the film such that a perforation of the film comes near a film passageway of the film cartridge.

11. A film feeding apparatus of a camera according to claim 1, wherein the first control means controls the film feeding means to feed the film such that a portion between frames of the film comes near a film passageway of the film cartridge.

12. A film feeding apparatus of a camera according to claim 1, further comprising deformation correcting means for correcting film deformation before the second control means controls the film feeding.

13. A film feeding apparatus according to claim 12, wherein the deformation correcting means corrects the deformation by rewinding into the film cartridge, the deformed portion of the film caused by a flange portion of the film cartridge and by maintaining for a predetermined time the rewound state of the film.

14. A film feeding apparatus of a camera capable of using a film cartridge containing a film and having a film feeding function, the film feeding apparatus comprising:

determining means for determining that the film of the film cartridge has not been exposed for a long time; and control means for moving a frame of the film to be next exposed to a position where the frame of the film is not susceptible to deformation by the film cartridge, when the determining means determines that the film has not been exposed for a long time.

15. A film feeding apparatus of a camera according to claim 14, wherein the determining means determines that the film has not been exposed for a long time, when a power switch of the camera is turned off.

16. A film feeding apparatus of a camera according to claim 14, wherein the determining means determines that the film has not been exposed for a long time, when an operation switch of the camera has not been operated for a predetermined time.

17. A film feeding apparatus of a camera according to claim 14, wherein the apparatus comprises film feeding means for feeding the film, and the control means controls the film feeding means such that the film frame to be next exposed will return to its former position when the photographing has been restarted.

18. A film feeding apparatus of a camera according to claim 17, wherein the control means Controls the film feeding means to rewind into the film cartridge a film portion deformed by the film cartridge, maintain the rewound state for a predetermined time, and then return the film frame to its former position, and the predetermined time is a period of time which is sufficient to correct the deformation by maintaining the rewound state.

19. A camera into which a film cartridge containing a film and having a film feeding function can be loaded, the camera comprising:

film feeding means for feeding the film;

feeding amount detecting means for detecting at least one of a feeding amount of the film fed by the film feeding means and a value substantially equal to the feeding amount of the film and for producing an output;

operating means operable for producing a permission signal and a prohibition for permitting and prohibiting, respectively, a photographing operation of the camera; and sequence means for controlling the film feeding means to feed the film by a predetermined amount in a first direction in response to the prohibition signal from the operating means and in a second direction opposite to the first direction in response to the permission signal from the operating means, wherein the sequence means determines that the film has been fed by the predetermined amount on the basis of the output of the feeding amount detecting means.

20. A camera according to claim 19, wherein the operating means is a power switch of the camera.

21. A camera according to claim 19, wherein the first direction is a direction in which the film is rewound, and the second direction is a direction in which the film is wound up.

22. A camera into which a film cartridge containing a film and having a film feeding function can be loaded, the camera comprising:

film feeding means for feeding the film;

feeding amount detecting means for detecting at least one of a feeding amount of the film fed by the film feeding means and a value substantially equal to the feeding amount of the film and for producing an output;

operating means operative for producing a photographing operation preparing signal of the camera;

timer means for counting time during which the operating means is not operated; and sequence means for controlling the film feeding means to feed the film by a predetermined amount in response to a predetermined value outputted by the timer means, and to wind up the film by the predetermined amount in response to the photographing operation preparing signal from the operating means, wherein the sequence means determines that the film has been fed and wound up, respectively, by the predetermined amount based on the output of the feeding mount detecting means.

23. A camera according to claim 22, wherein the camera comprises a second operating means operable for producing a permission signal and a prohibition signal for permitting and prohibiting, respectively, a photographing operation of the camera, and the sequence means rewinds the film by the predetermined amount in response to the prohibition signal from the second operating means.

24. A camera according to claim 22, wherein the sequence means controls the film feeding means to feed the film such that an exposed frame comes near a film passageway of the film cartridge when the film is rewound for the predetermined amount.

25. A camera according to claim 22, wherein the sequence means controls the film feeding means to feed the film such that a perforation of the film for detecting the feeding amount comes near a film passageway of the film cartridge when the film is rewound for the predetermined amount.

26. A camera according to claim 22, wherein the sequence means controls the film feeding means to feed the film such that a portion between frames of the film comes near a film passageway of the film cartridge when the film is rewound by the predetermined amount.

27. A film feeding apparatus of a camera into which a film cartridge containing a film and having a film feeding function can be used the film feeding apparatus comprising:

film feeding means for feeding the film;

first film feeding control means for controlling the film feeding means to feed the film into the film cartridge by a predetermined amount sufficient to feed into the film cartridge a portion of an unexposed frame of the film deformed by the film cartridge, wherein the first film feeding control means controls the film feeding means to feed the film by the predetermined amount when the camera is in a photographing preparation state, or when the camera is started to operate and wherein the photographing preparation state is the state of a power switch of the camera switched from off to on, and the camera is started to operate when a first stroke of a release button of the camera is operated;

holding means for holding in the film cartridge for a predetermined time the film rewound by the film feeding means; and second film feeding control means for controlling the film feeding means to feed the film out of the film cartridge by the predetermined amount after the predetermined time has passed, to correct the deformed portion of the film.

28. A film feeding apparatus of a camera into which a film cartridge containing a film and having a film feeding function can be used, wherein the camera comprises determining means for determining whether the camera has not been operated for a predetermined time to expose film, and memory means for storing the nonoperative state of the camera determined by the determining means, the film feeding apparatus comprising:

film feeding means for feeding the film;

first film feeding control means for controlling the film feeding means to feed the film into the film cartridge by a predetermined amount sufficient to feed into the film cartridge a portion of an unexposed frame of the film deformed by the film cartridge and the first film feeding control means controls the film feeding means to feed the film by the predetermined amount if the nonoperative state is stored in the memory means;

holding means for holding in the film cartridge for a predetermined time the film rewound by the film feeding means; and second film feeding control means for controlling the film feeding means to feed the film out of the film cartridge by the predetermined amount after the predetermined time has passed, to correct the deformed portion of the film.

29. A film feeding apparatus of a camera into which a film cartridge containing a film and having a film feeding function can be used, the film feeding apparatus comprising:

film feeding means for feeding the film;

first film feeding control means for controlling the film feeding means to feed the film into the film cartridge by a predetermined amount sufficient to feed into the film cartridge a portion of an unexposed frame of the film deformed by the film cartridge, wherein the first film feeding control means controls the film feeding means to feed the film by the predetermined amount each time a predetermined start-up instruction is inputted to the camera while the camera is in a photographing preparation state, wherein the film is fed by the predetermined amount only when the predetermined start-up instruction has not been inputted to the camera for a predetermined time;

holding means for holding in the film cartridge for a predetermined time the film rewound by the film feeding means; and second film feeding control means for controlling the film feeding means to feed the film out of the film cartridge by the predetermined amount after the predetermined time has passed, to correct the deformed portion of the film.

30. A film feeding apparatus of a camera into which a film cartridge containing a film and having a film feeding function can be used, the film feeding apparatus comprising:

detecting means for detecting that the camera has been changed from a nonoperative state to a photographing preparation state; and feeding control means for feeding a deformed portion of the film caused by the film cartridge into the film cartridge by a predetermined amount when the detecting means has detected the photographing preparation state, whereby the deformed portion is corrected.

31. A film feeding apparatus of a camera according to claim 30, wherein the film is fed out of the film cartridge by the predetermined amount after the deformed portion has been corrected in the film cartridge.

* * * * *